(12) United States Patent
Kouskoulas et al.

(10) Patent No.: US 12,259,805 B1
(45) Date of Patent: Mar. 25, 2025

(54) METHODS AND SYSTEMS FOR IDENTIFYING CONTROL FLOW PATTERNS AND DATAFLOW CONSTRAINTS IN SOFTWARE CODE TO DETECT SOFTWARE ANOMALIES

(71) Applicant: Affirm Logic Corporation, McLean, VA (US)

(72) Inventors: Yanni Kouskoulas, Seattle, WA (US); Ada Lindberg, Knoxville, TN (US); Arion Lawrence, Vienna, VA (US); Chris O'Ferrell, Burleson, TX (US)

(73) Assignee: Affirm Logic Corporation, McLean, VA (US)

( * ) Notice: Subject to any disclaimer, the term of this patent is extended or adjusted under 35 U.S.C. 154(b) by 0 days.

(21) Appl. No.: 18/621,875

(22) Filed: Mar. 29, 2024

(51) Int. Cl.
*G06F 9/44* (2018.01)
*G06F 11/362* (2025.01)

(52) U.S. Cl.
CPC .................... *G06F 11/3636* (2013.01)

(58) Field of Classification Search
CPC .................................... G06F 11/3636
See application file for complete search history.

(56) References Cited

U.S. PATENT DOCUMENTS

| | | | |
|---|---|---|---|
| 9,038,033 B1 | 5/2015 | Hidayat | |
| 9,507,945 B2 | 11/2016 | Kouskoulas et al. | |
| 9,824,216 B1 | 11/2017 | Yasir et al. | |
| 10,445,502 B1 | 10/2019 | Shivani et al. | |
| 10,803,051 B2 | 10/2020 | Deb et al. | |
| 11,645,388 B1 | 5/2023 | Colleen et al. | |
| 11,979,428 B1 | 5/2024 | Abdoul et al. | |
| 2010/0293407 A1 | 11/2010 | Locasto et al. | |
| 2014/0026127 A1 | 1/2014 | McEwan | |
| 2016/0371494 A1* | 12/2016 | Daymont | G06F 11/3668 |
| 2017/0199730 A1* | 7/2017 | Hay | G06F 16/9024 |
| 2018/0316715 A1* | 11/2018 | Liu | H04L 63/1466 |
| 2019/0207969 A1 | 7/2019 | Brown | |

(Continued)

OTHER PUBLICATIONS

Non-Final Office Action for U.S. Appl. No. 18/498,999 dated Jan. 23, 2024, 16 pages.

(Continued)

*Primary Examiner* — Hang Pan
(74) *Attorney, Agent, or Firm* — Cooley LLP

(57) ABSTRACT

A method includes receiving executable binary code and a machine-readable specification that (1) defines a control flow pattern and a dataflow constraint and (2) is associated with a library function call. A target of a library function call site is retrieved, the library function call site being associated with the library function call and included in the executable binary code. An indication of an execution path in the executable binary code is identified based on the control flow pattern the target. An argument of the library function call is identified based on the dataflow constraint, the target, and the indication of the execution path. The method also includes determining, using solver software, that the argument satisfies the dataflow constraint defined by machine-readable specification. In response to the determining, a signal that indicates that the executable binary code is associated with a predetermined software action is transmitted.

23 Claims, 9 Drawing Sheets

(56) References Cited

U.S. PATENT DOCUMENTS

2021/0099483 A1* 4/2021 Shukla .................. G06F 21/566

OTHER PUBLICATIONS

[Author Unknown] "Open Source Ghidra, The First Few Months," Recon MTL 2019, 51 pages.

[Author Unknown] "Writing Yara Rules—yara 4.4.0. documentation", 2014, 36 pages. Retrieved online: https://yara.readthedocs.io/en/stable/writingsrules.html.

Ballenthin et al., "capa: Automatically Identify Malware Capabilities", Threat Research, Jul. 16, 2020 (last updated Nov. 29, 2023), 13 pages.

National Cybersecurity and Communications Integration Center (NCCIC), "Using Yara for Malware Detection", May/Jun. 2015, 1 page.

Cheng L., et al., "Checking is believing: Event-aware program anomaly detection in cyber-physical systems." IEEE Transactions on Dependable and Secure Computing 18.2 (2019): pp. 825-842. (Year: 2019).

Kronjee J., et al., "Discovering software vulnerabilities using data-flow analysis and machine learning." Proceedings of the 13th international conference on availability, reliability and security. 2018.pp. 1-10 (Year: 2018).

Lin G., et al., "Software vulnerability detection using deep neural networks: a survey." Proceedings of the IEEE 108.10 (2020): pp. 1825-1848. (Year: 2020).

Non-Final Office Action for U.S. Appl. No. 18/590,781 dated Jun. 12, 2024, 20 pages.

Notice of Allowance for U.S. Appl. No. 18/498,999 dated May 13, 2024, 5 pages.

Notice of Allowance for U.S. Appl. No. 18/498,999 mailed Aug. 28, 2024, 5 pages.

Dwyer, M B et al., "Data flow analysis for verifying properties of concurrent programs." ACM SIGSOFT Software Engineering Notes 19.5 (1994): pp. 62-75.

Gupta R et al., "A framework for partial data flow analysis." Proceedings 1994 International Conference on Software Maintenance. IEEE, pp. 4-13, 1994.

Olender, K M et al., "Cecil: A sequencing constraint language for automatic static analysis generation." IEEE Transactions on Software Engineering 16.3 (1990): pp. 268-280.

* cited by examiner ated Sep. 9, 2025

METHODS AND SYSTEMS FOR IDENTIFYING CONTROL FLOW PATTERNS AND DATAFLOW CONSTRAINTS IN SOFTWARE CODE TO DETECT SOFTWARE ANOMALIES

FIELD

The present disclosure generally relates to software code analysis, and more specifically, to systems and methods for defining and analyzing control flow patterns and dataflow constraints in software code to detect software anomalies related to cybersecurity.

BACKGROUND

Programs can use function calls to access system resources and complete objectives. In some instances, binary code that includes a pattern of one or more function call sites can be indicative of a software behavior of interest. Alternatively or in addition, in some instances, binary code that passes an argument across a function boundary associated with a function call site can be indicative of yet another software behavior of interest. A software behavior of interest can be indicative of, for example, a software anomaly, malware, and/or a cybersecurity issue. The binary code, however, can be difficult to interpret if the source code is unavailable or without executing the binary code. Thus, a need exists for methods and systems for describing patterns of function call sites indicative of software behaviors of interest and performing static analysis on binary code to detect those patterns.

SUMMARY

In an embodiment, a method includes receiving executable binary code and a machine-readable specification that (1) defines a control flow pattern and a dataflow constraint and (2) is associated with a library function call. Machine-readable code is executed to retrieve a target of a library function call site, the target being reachable by one or more indirect jumps, and the library function call site being associated with the library function call and included in the executable binary code. An indication of an execution path in the executable binary code is identified based on (1) the control flow pattern defined by the machine-readable specification and (2) the target. An argument of the library function call is identified based on (1) the dataflow constraint defined by the machine-readable specification, (2) the target, and (3) the indication of the execution path. The method also includes determining, using solver software, that the argument satisfies the dataflow constraint defined by machine-readable specification. A signal that indicates that the executable binary code is associated with a predetermined software action is transmitted in response to at least one of (1) the identifying the indication of the execution path or (2) the determining that the argument satisfies the dataflow constraint.

In an embodiment, a non-transitory processor-readable medium stores code representing instructions to be executed by one or more processors, and the instructions include code to cause the one or more processors to receive (1) a file that includes executable binary code and (2) a machine-readable specification that defines (a) a predefined pattern of program instructions and (b) a dataflow constraint associated with a variable. Additionally, the one or more processors generate a control flow graph based on (1) the executable binary code and (2) a map associated with at least one instruction to be called by the executable binary code. The instructions further include instructions to identify, based on the machine-readable specification and the control flow graph, the predefined pattern of program instructions as being included in the executable binary code. In response to the predefined pattern of program instructions being included in a path of the executable binary code, the one or more processors return the path of the executable binary code that includes the predefined pattern of program instructions, and further generate a machine-readable predicate set based on the path of the executable binary code. The instructions further include instructions to (1) identify a memory location associated with the variable based on the map, (2) bind the dataflow constraint to the memory location, and (3) generate a machine-readable constrained predicate set based on the machine-readable predicate set and the dataflow constraint bound to the memory location. Additionally, the one or more processors evaluate, using solver software, the machine-readable constrained predicate set to generate a determination that the executable binary code satisfies the dataflow constraint for at least one possible execution path of the executable binary code. Based on the determination, a signal is sent that indicates that the executable binary code includes the predefined pattern of program instructions that satisfies the dataflow constraint for the at least one possible execution path of the executable binary code.

DETAILED DESCRIPTION

Figure 1:
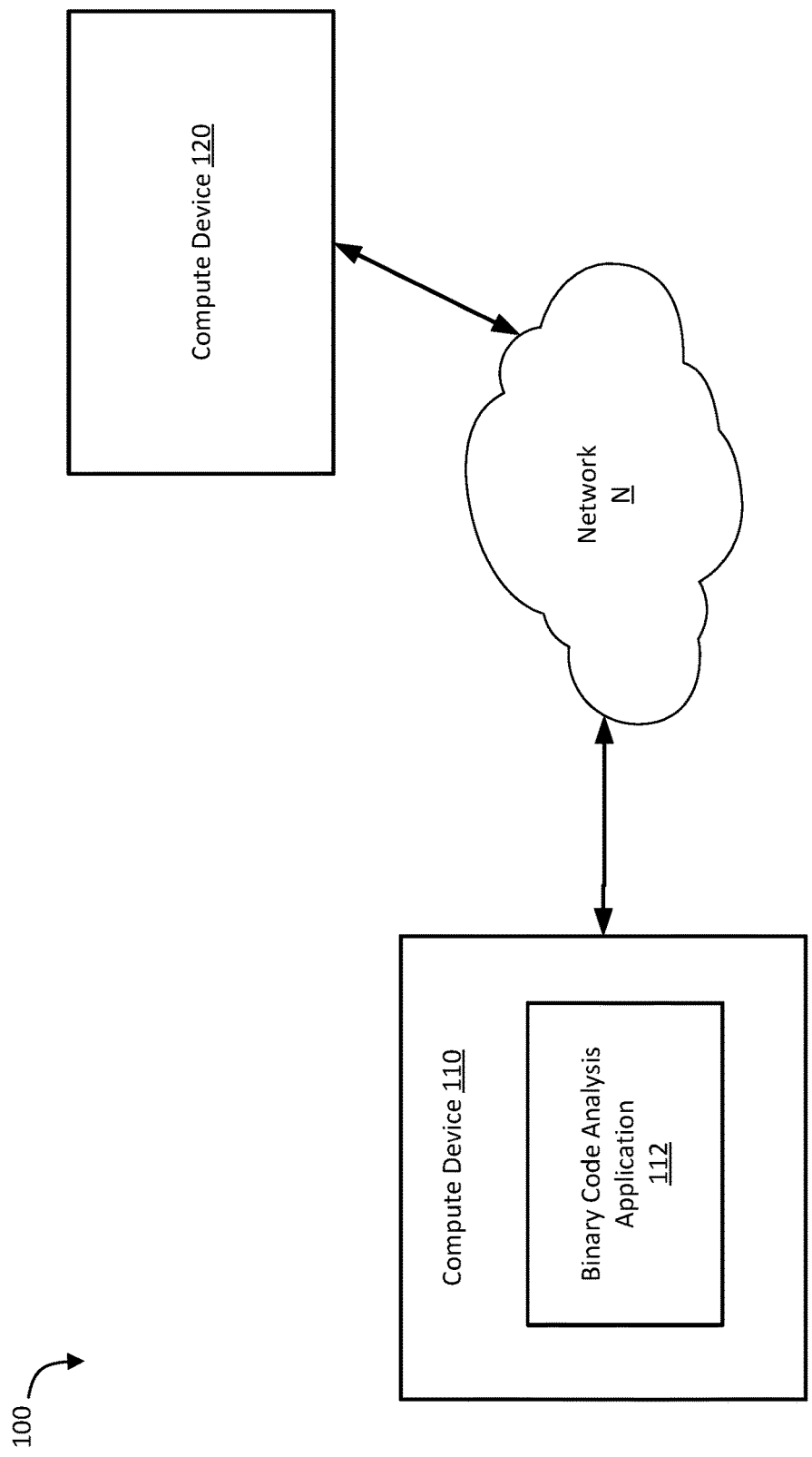
FIG. 1 is a schematic representation of a binary code analysis system for detecting control flow patterns in binary code and for evaluating the binary code based on dataflow constraints, according to some embodiments.

A program executed at a compute device can affect (e.g., use, harm, etc.) systems and resources that are internal and/or external to the compute device. These systems can include, for example, a display, network, memory, other compute devices, and/or the like. Specifically, the program can include atoms (e.g., segments and/or lines) of code that are configured to access system resources to complete an objective. These atoms can be associated with, for example, function calls configured to access privileged (e.g., restricted and/or permission-gated) operating system (e.g., kernel) code that can access and/or use hardware resources (e.g., a display, network, memory, and/or the like). These atoms can include, for example, system call sites and/or other specialized instructions. In user-privileged code, for example, system calls can include dynamically loaded system library calls, which can generate soft interrupts to access an operating system (OS). In OS and/or driver code, for example, system calls can include direct call instructions and/or privileged hardware instructions. Given that atoms (e.g., system call sites) can cause a program to use and/or impact external resources (e.g., via a system call), some arguments (e.g., function inputs and/or values accepted by functions) passed to these atoms can indicate a predetermined software action associated with, for example, undesirable software, malicious software (e.g., malware), poorly performing software, vulnerable software, and/or the like. For example, a program configured, based on an argument(s) passed to a system call site(s), to perform a set of one or more predetermined software actions can cause the program to have an undesired software behavior (e.g., a collective effect during a time period and/or a series of instructions).

Malicious software or malicious processes, otherwise referred to as malware, can be intrusive and/or unauthorized software designed to damage, destroy, or cause harm to computers, computer systems, users, or other entities or devices. Malware can be implemented, distributed, and/or stored via artifacts including computer files ("computer file(s)" or "file(s)") such as text or document files (collectively, "document file(s)") of various filetypes. Such files can be distributed or communicated via network (e.g., Internet) communications. For example, document files can include embedded, executable scripts or macros that, in some cases, can be configured to cause malicious activity on a host device (e.g., a computer) or in a host environment (e.g., of a computer, virtual machine, etc.). Malware can also be associated with a variety of other artifacts including uniform resource locators (URLs), Internet Protocol (IP) addresses, computer processes, registry entries, and/or the like, which may be used, generated, or modified to mediate malware distribution and/or execution. Examples of common malware include viruses, worms, Trojan horse viruses, spyware, adware, and ransomware. In some instances, software can have harmful and/or unintended consequences without the creator of that software having malicious intent and/or motives. For example, software can exhibit harmful and/or unintended behaviors as a result of human error or an oversight on the part of the creator.

Some embodiments disclosed herein include systems and methods to implement control flow and/or dataflow analysis configured to identify predetermined software actions caused by binary data files. The systems and methods can be used, for example, to detect and/or cause prevention of unauthorized use of operating system functions and/or shared library functions. The analysis and/or parsing to perform the detection of a predetermined software action (e.g., an action associated with malware) associated with binary code can be performed without executing and/or referencing the binary code. As described herein (e.g., at least in relation to FIG. 5), the disclosed systems and methods that implement the control flow and/or dataflow analysis can be configured to detect a predetermined software action associated with binary code based on a user-defined, machine-readable specification specifying at least one control flow pattern and/or dataflow constraint.

FIG. 1 is a schematic diagram of a binary code analysis system 100 for analyzing whether software code (e.g., binary code) satisfies a dataflow constraint(s), according to an embodiment. The binary code analysis system 100 includes compute devices 110 and 120, and network N. The binary code analysis system 100 can include alternative configurations to that shown in FIG. 1, and various steps and/or functions of the processes described below can be shared among the various devices of the binary code analysis system 100 or can be assigned to specific devices (e.g., the compute devices 110 and 120, and/or the like).

Each of the compute devices 110 and/or 120 can include any suitable hardware-based computing devices and/or multimedia devices, such as, for example, a server, a desktop compute device, a smartphone, a tablet, a wearable device, a laptop and/or the like. In some implementations, the compute devices 110 and/or 120 can be implemented within a distributed compute framework and/or a remote computing facility. In some implementations, each of the compute devices 110 and/or 120 can be a data center or other control facility configured to run a distributed computing system and can communicate with other compute devices. In some implementations, the compute devices 110 and/or 120 can be included in a client-server configuration. As described herein, at least one of the compute devices 110 and/or 120 can be used for running an application (e.g., via an execution processor) and/or otherwise implementing steps in a method (e.g., a binary code analysis method, as described herein).

In some implementations, the binary code analysis system 100 can include a distributed computing system implemented by three or more compute devices (e.g., one or more compute devices in addition to the compute devices 110 and 120 shown in FIG. 1). In some examples, each compute device from a plurality of compute devices can include one or more of processors, respectively, and one or more memories. As described below, the processors can function similar to the processor 220 in FIG. 2, and/or the memories can function similar to memory 210 in FIG. 2 (discussed below).

The compute device 110 can be configured to execute (e.g., via an analysis processor) a binary code analysis application 112. The binary code analysis application 112 can include instructions which, when executed by the processor (e.g., the processor 220 of FIG. 2, as described herein), cause the compute device 110 to perform various steps and/or functions (e.g., implementing a control flow pattern search, a function call lookup operation, an argument search, a function call lookup operation, and/or other steps and/or functions), as described herein. The binary code analysis application 112 can further include instructions for generating a user interface (e.g., graphical user interface (GUI)) that is configured to collect information from a user (e.g., configuration settings, control flow patterns of interest, argument constraints of interest, etc.) and/or display evaluation results and/or program slices, as described herein. In some implementations, the configuration settings can specify an operating system type, linker strategy, loader strategy, and/or the like. In some implementations, the compute device 110 can be configured to automatically (e.g., without human intervention) detect the operating system type, linker strategy, loader strategy, and/or the like, based on the binary code and/or executable file being analyzed.

In some implementations, the compute device 120 can be associated with, for example, a user, organization, etc., that intends/desires to execute (e.g., via an execution processor included in the compute device 120) code to be analyzed using the binary code analysis application 112. For example, software code can be analyzed via the processor of the compute device 110 to determine if the software code is associated with a predetermined software action (e.g., a software behavior associated with malware). If, for example, the compute device 110 determines that the software code is not associated with the software behavior of interest, the compute device 110 can be configured to cause transmission (e.g., via the network N) of the software code to the compute device 120, such that the compute device 120 can execute the software code via the execution processor. In some implementations, the compute device 110 can be configured to automatically (e.g., without human intervention) modify the software code in response to determining that the software code is associated with the predetermined software action. For example, in some instances, the software code can be modified such that its execution excludes control flow associated with a control flow pattern (described herein) and/or dataflow that satisfies a dataflow constraint. Similarly stated, the software code can be modified such that its execution excludes the predetermined software action. For example, the compute device 110 can be configured to remove and/or disable a binary code portion associated with the predetermined software action and permit the remaining binary code to be executed. In response to modifying the software code, the compute device 110 can be configured to cause transmission of the modified software code to the compute device 120, such that the compute device 120 can execute the modified software code via the execution processor.

Binary code at the compute device 120 can be accessed and/or analyzed by the compute device 110 in at least one arrangement. For example, as shown in FIG. 1, the compute device 120 can send the binary code to the compute device 110 via the network N. Alternatively or in addition, in some implementations, the compute device 110 can analyze software code at the compute device 120 (e.g., via remote access). Alternatively or in addition, in some implementations, the compute device 110 can be a sandbox included on the compute device 120. In some implementations, the compute device 120 can send the software code to the compute device 110 for analysis, after which the compute device can send the software code back to the compute device 120. Alternatively or in addition, in some implementations, the compute device 110 can be associated with a network security measure such as, for example, an "air gap." For example, the compute device 110 can be physically isolated from the compute device 120, and binary code to be analyzed can be manually delivered to the compute device 110. For example, a storage device can be manually delivered without a connection between compute devices 110 and 120. In some instances, the compute device 110 can be configured to analyze the software code without executing the software code via the processor, which can protect the compute device 110 and/or 120 from effects of undesired software behavior.

The compute devices 110 and/or 120 can be networked via the network N directly or indirectly using wired connections and/or wireless connections. The network N can include various configurations and protocols, including short range communication protocols such as, for example, Bluetooth®, Bluetooth® LE, the Internet, World Wide Web, intranets, virtual private networks, wide area networks, local networks, private networks using communication protocols proprietary to one or more companies, Ethernet, WiFi® and HTTP, and various combinations of the foregoing. Such communication can be facilitated by any device capable of transmitting data to and from other compute devices, such as a modem(s) and/or a wireless interface(s).

Figure 2:
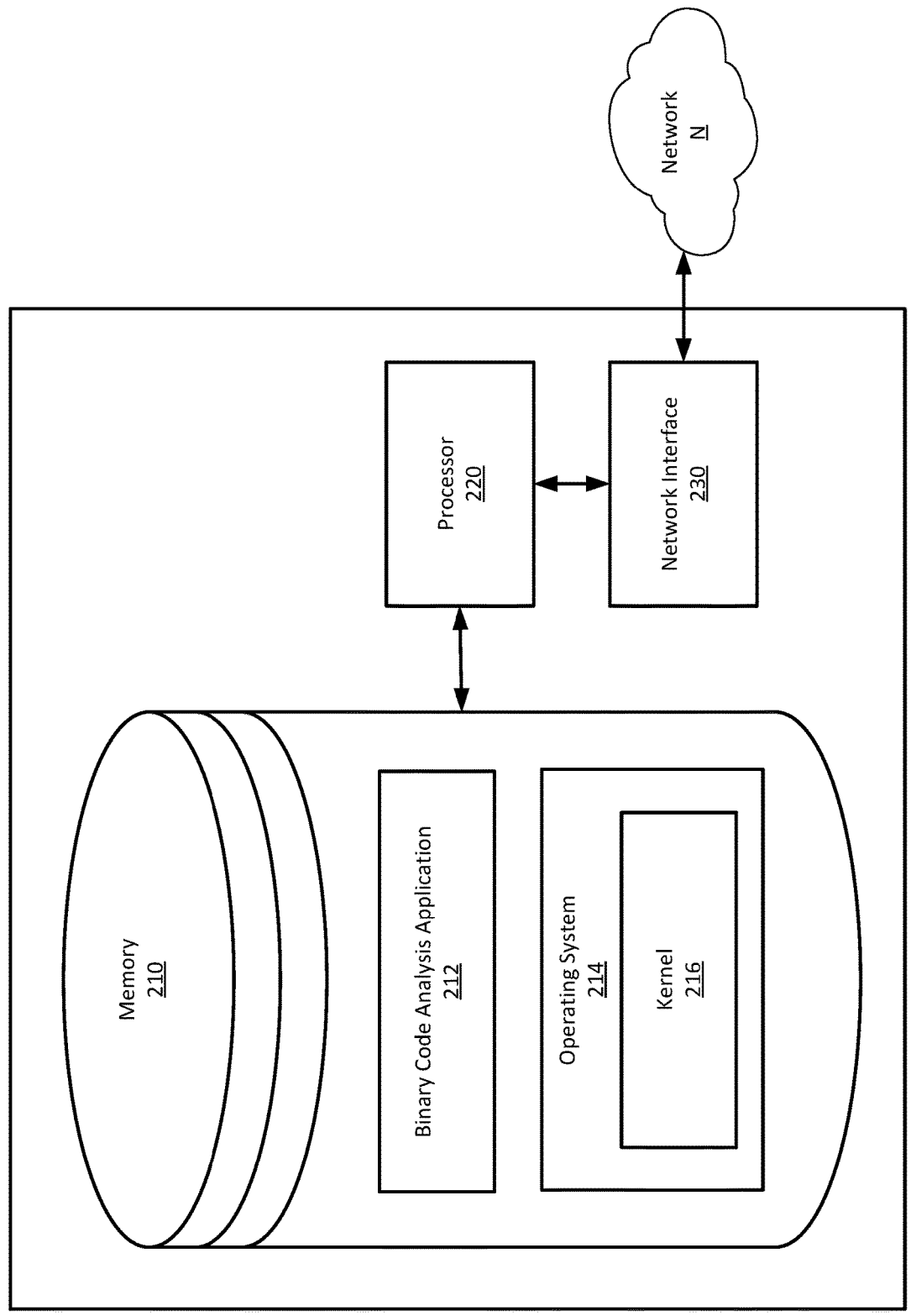
FIG. 2 is a schematic diagram of a compute device included in a binary code analysis system, according to an embodiment.

FIG. 2 is a schematic diagram of a compute device 201 of a system, according to an embodiment. The compute device 201 can be structurally and/or functionally similar to, for example, the compute devices 110 of the system 100 shown in FIG. 1. Compute device 201 can be a hardware-based computing device, a multimedia device, or a cloud-based device such as, for example, a computer device, a server, a desktop compute device, a laptop, a smartphone, a tablet, a wearable device, a remote computing infrastructure, and/or the like. Compute device 201 includes a memory 210, a processor 220, and one or more network interface controllers 230.

The processor 220 can be, for example, a hardware based integrated circuit (IC), or any other suitable processing device configured to run and/or execute a set of instructions or code (e.g., stored in memory 210). For example, the processor 220 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a remote cluster of one or more processors associated with a cloud-based computing infrastructure and/or the like. The processor 220 is operatively coupled to the memory 210 (described herein). In some embodiments, for example, the processor 220 can be coupled to the memory 210 through a system bus (for example, address bus, data bus and/or control bus).

The memory 210 can be, for example, a random-access memory (RAM), a memory buffer, a hard drive, a read-only memory (ROM), an erasable programmable read-only memory (EPROM), and/or the like. The memory 210 can store, for example, one or more software modules and/or code that can include instructions to cause the processor 220 to perform one or more processes, functions, and/or the like. In some implementations, the memory 210 can be a portable memory (e.g., a flash drive, a portable hard disk, and/or the like) that can be operatively coupled to the processor 220. In some instances, the memory can be remotely operatively coupled with the compute device 201, for example, via the one or more network interface controllers 230. For example, a remote database server (not shown) can be operatively coupled to the compute device 201.

The memory 210 can store various instructions associated with algorithms and/or data, including pattern analysis algorithms, machine learning algorithms, constraint solvers, and/or the like. The memory 210 can further include any non-transitory computer-readable storage medium for storing data and/or software that is executable by processor 220, and/or any other medium, which may be used to store information that may be accessed by processor 220 to control the operation of the compute device 201. For example, the memory 210 can store data associated with a binary code analysis application 212. The binary code analysis application 212 can be functionally and/or structurally similar to the binary code analysis application 112 of FIG. 1 and/or the binary code analysis application 312 (described herein) of FIG. 3. The memory 210 can also store data associated with an operating system 214.

Figure 3:
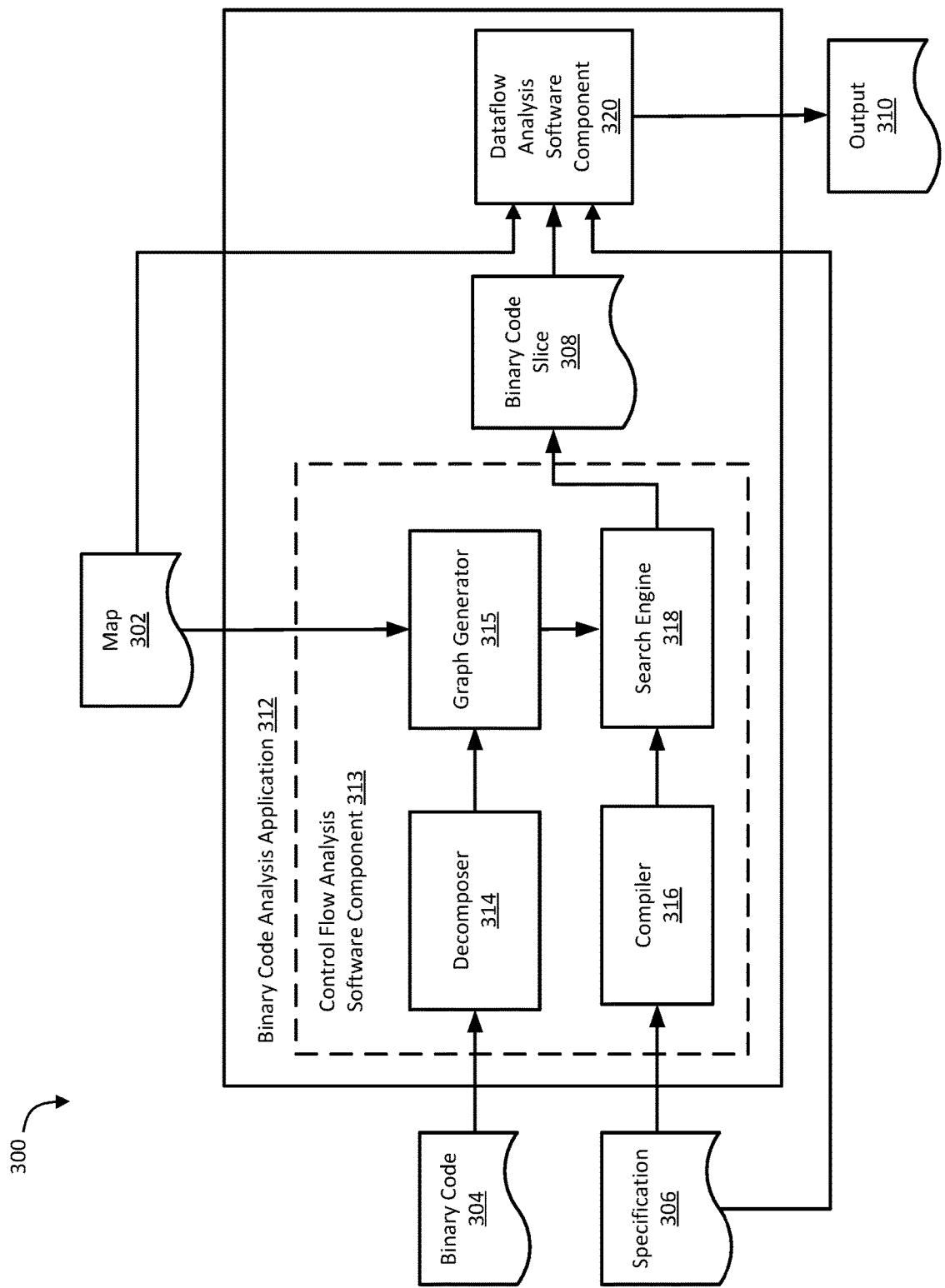
FIG. 3 is a first schematic diagram of software code segments included in a binary code analysis system, according to an embodiment.

As described herein at least in relation to FIG. 3, the binary code analysis application 212 can be configured to apply a predefined (e.g., user defined) constraint(s) to a variable(s), argument(s), and/or expression(s), within a portion of binary code, where the portion can be determined based on a predetermined (e.g., user defined) control flow pattern. The binary code analysis application 212 can be further configured to evaluate whether at least one possible execution of the binary code satisfies the predefined constraint(s). Binary code that satisfies the predefined constraint(s) can be associated with, for example, malware, an undesired and/or predetermined software action, etc.

The operating system 214 can include a plurality of programs, functions and/or processes that are routine to the operations of the compute device 201. For example, the operating system 214 can provide functions such as task scheduling, file system management, memory management, caching, profiling, networking (e.g., via the one or more network interface controllers 230, discussed herein), hardware device drivers (e.g., via a device interface controller), and/or the like. The operating system 214 can further include and/or interact with a kernel 216 configured to implement a function of the operating system 214 by providing application programs (e.g., a program that includes the binary code 304 of FIG. 3, described herein) with access to resources associated with the compute device 201. The kernel 216 can be associated with a plurality of system calls that, for example, relate to a filesystem stored in one or more memories (e.g., memory 210 and the like). An operating system can use the filesystem to store, organize, and/or manage files and folders stored on a storage device (e.g., the memory 210).

For example, the kernel 216 can include one or more kernels from a plurality of kernels, each kernel including a program configured to implement a function associated with the operating system (e.g., the operating system 214 of FIG. 2). The kernel 216 can be configured to process system calls (e.g., calls included in the binary code 304, described herein) related to the filesystem. These system calls can include, for example, a call to open a file, a call to close a file, a call to read a directory, a call to obtain file information, a call to create a file, a call to change the size of a file, a call to set metadata (e.g., a name, a modified status, and/or a time) associated with a file, a call to overwrite a file, a call to delete a file, a call to read metadata associated with a filesystem (e.g., metadata associated with the root of a filesystem), a call to write to a file, and/or a call to read from a file. If, for example, the system calls are associated with an undesired software behavior, files within the filesystem can be compromised, destroyed, copied without authorization, etc.

In some implementations, binary code undergoing analysis (e.g., the binary code 304 of FIG. 3) may not execute at the processor 220 and/or may not execute using the operating system 214 and/or the kernel 216. For example, in some implementations, the binary code analysis application 212 can reference data (e.g., jump tables) included in the operating system 214 and/or associated with the kernel 216. In some implementations, the operating system 214 and/or the kernel 216 can be used to cause the binary code analysis application 212 to execute but is not used to execute the binary code undergoing analysis. In some implementations, the binary code analysis application 212 can reference a data structure stored at the memory 210, rather than a data structure included in the kernel 216, to identify function call sites and/or arguments within the binary code. The data structure can include, for example, a map between function call sites and target functions. In some instances, the data structure can be associated with an operating system that is different from the operating system 214.

The one or more network interface controllers 230 can be configured to connect to the network N using, for example, any of the wired and wireless short range communication protocols described above. Moreover, the network N can be or include, for example, one or more of a cellular data network, a satellite network, free space optical network and/or the Internet.

In some instances, the compute device 201 can further include a display, an input device, and/or an output module (not shown in FIG. 2). The display can be, for example, any display device by which the compute device 201 can output and/or display data. The input device can include, for example, a mouse, keyboard, touch screen, voice interface, and/or any other hand-held controller or device or interface via which a user may interact with the compute device 201. The output module can include, for example, a bus, port, and/or other interfaces by which the compute device 201 may connect to and/or output data to other devices and/or peripherals.

FIG. 3 is a schematic diagram of software code segments 300 included in a binary code analysis system, according to an embodiment. The binary code analysis system can be structurally and/or functionally equivalent to the binary code analysis system 100 of FIG. 1. The software code segments 300 can be associated with a compute device (e.g., a compute device that is structurally and/or functionally similar to the compute device 201 of FIG. 2 and/or the compute device 110 of FIG. 1). In some instances, for example, at least a portion of the software code segments 300 can be implemented in software stored in memory 210 and configured to execute via the processor 220 of FIG. 2. In some instances, for example, at least a portion of the software code segments 300 can be implemented in hardware. The software code segments 300 can include a map 302, binary code 304, a specification 306, a binary code analysis application 312, and an output 310.

The binary code 304 can be associated with a file (e.g., an executable file, application, and/or the like) to be executed at a target processor (e.g., a processor associated with the compute device 120 of FIG. 1). In some implementations, the binary code 304 can encode data (e.g., character strings) as bit strings. The binary code 304 can represent machine-executable instructions, data, and/or the like, using a symbolic system. For example, the symbolic system can include a two-symbol system associated with a binary number system. In some instances, the binary code 304 can be interpreted using other number systems, such as a hexadecimal number system. In some instances, the binary code 304 can be generated (e.g., using a compiler) from source code associated with a human-readable programming language.

The binary code 304 can include one or more function call sites (e.g., a line(s) of code where a function is called). In some instances, the one or more function call sites can include a call(s) to one or more libraries and can include, for example, a system call(s) and/or a privileged non-system call(s), as described herein. For example, the binary code 304 can include user-privileged code that uses external calls to dynamically linked system libraries (e.g., DLLs). In some instances, the function call(s) can include an indirect function call(s), where a memory address(es) associated with the function to be called is not included in the binary code 304. In some instances, an indirect function call can be associated with a pointer (e.g., a reference) to an address of a function, where the address is not determined until runtime (as opposed to, for example a compile time associated with the generation of the binary code 304).

To further illustrate, rather than pointing directly to an address of an instruction/function to be executed, an indirect function call can include a pointer to a register and/or memory location (e.g., as determined by a linker during a compile time that results in the binary code 304) that can be loaded (e.g., via a loader) with an address of the function/instruction to be executed as a result of the function call. Said differently, an indirect function call site can include code that specifies an indirect jump (e.g., that transfers control using values at a location in memory/address where the associated function is stored). In some instances, the linker can generate and/or configure a jump table (e.g., an array of pointers) that can store pointers to jump to target addresses of functions. The linker can also modify the one or more function call sites included in the binary code 304 to include the pointers included in the jump table. At runtime (e.g., when the binary code 304 is to be executed), the loader can be configured to dynamically populate address values for the pointers in the jump table, where each address value is associated with a function to be called/invoked from a function call site.

In some instances, a linker strategy can be known and/or predefined, such that the binary code analysis application 312 can interpret, without executing the binary code 304, an associated jump table (e.g., the map 302, described further herein) provided as input to the binary code analysis application 312. Alternatively or in addition, the binary code analysis application 312 can be configured to perform a preprocessing step that can include taking apart a binary executable to be analyzed, parsing into sections an object file included in the binary executable, disassembling instructions from the object file (e.g., to produce the binary code 304), and acting statically (e.g., like a dynamic loader and/or a dynamic linker) to resolve relocations and manage virtual memory as if the binary executable was being executed. Based on an architecture-defined strategy to define ways in which the binary executable can dynamically load libraries and/or resolve indirect jumps, a target (e.g., a function call) and/or its calling convention can be determined. The disassembled result can include machine-independent intermediate assembly, which can facilitate analysis of different architectures based on a known linking and/or loader process.

The specification 306 can include code associated with a domain-specific programming language (as described in relation to, for example, FIG. 5) and configured to describe/define a program behavior, control flow behavior, a dataflow constraint(s), etc. The specification 306 can be functionally and/or structurally (e.g., as to format, syntax, semantics, and/or the like) equivalent to the specification 406 of FIG. 4 and/or the specification 506 of FIG. 5, described below.

A control flow pattern can include, for example, an indication of an execution order of a set of at least one statement, instruction, code block, and/or function call. A function call can include, for example, a library call, a system call (e.g., a function call configured to request a service(s) from an operating system (e.g., the operating system 214 of FIG. 2)), a privileged instruction (e.g., an instruction associated with a special permission(s), configured to have direct access to system resources, and/or configured to run in kernel mode), and/or the like. The specification 306 can be configured to define a plurality of types of control flow patterns, as described in relation to, for example, FIG. 5 herein. The binary code analysis application 312 can use the specification 306 as input to determine whether the binary code 304 exhibits the defined control flow pattern.

A constraint can include a constraint on an argument to identify (e.g., based on the constraint being satisfied or violated) arguments and/or system call sites associated with a predetermined software action of interest. The binary code analysis application 312 can use the specification 306 as input to determine whether execution of the binary code 304 satisfies the dataflow constraint. A dataflow constraint can be represented by, for example, an arithmetic operation, a logical operation, a bitwise operation, a metafunction (described herein), and/or the like. The dataflow constraint can be associated with an argument passed to a function via a function call site within the binary code 304.

The binary code analysis application 312 can be functionally and/or structurally similar to the binary code analysis application 112 of FIG. 1 and/or the binary code analysis application 212 of FIG. 2. The binary code analysis application 312 can include a control flow analysis software component 313 and a dataflow analysis software component 320, both of which can be arranged in series, such that a binary code slice 308 output by the control flow analysis software component 313 is an input to the dataflow analysis software component 320. Specifically, as described further herein, the control flow analysis software component 313 can be used to identify a portion of the binary code 304 that includes one or more predefined function call sites, and the dataflow analysis software component 320 can be configured to determine if that portion of the binary code 304 (e.g., the portion identified by the control flow analysis software component 313) satisfies one or more constraints. The control flow analysis software component 313 can include a decomposer 314, a compiler 316, a graph generator 315, and a search engine 318. The dataflow analysis software component 320 is described herein at least in relation to FIG. 4.

The decomposer 314 can be configured to automatically (e.g., without human intervention) decompose/segment code to reduce a problem size (e.g., an amount of code to be analyzed). For example, the decomposer 314 can be configured to generate a program chunk(s), which can include, for example, contiguous or noncontiguous segments of code, execution paths (e.g., sequences of instructions arranged in execution order), and/or subprograms. The program chunk can be smaller subset of code as compared to the overall code included in the binary code 304. The decomposer 314 can be configured to segment the binary code 304 based on, for example, code within the binary code 304 that is interrelated. Interrelated code can include, for example, code used to generate a result (e.g., an intermediate result) of interest. In some instances, interrelated code can exclude, for example, code that does not affect the value of interest. In some instances, a program chunk can include code associated with (e.g., used to implement and/or dependent upon) a function call. A program chunk generated by the decomposer 314 can include a reduced (e.g., minimal, near minimal, or approximately minimal) number of statements to be analyzed compared to the total number of statements included in the binary code 304. If multiple program chunks are generated from the binary code 304 using the decomposer 314, the software code segments 300 can be configured to analyze the multiple chunks in parallel/concurrently (e.g., using parallel processing), resulting in improved efficiency and/or processing time. For example, multiple instances of the graph generator 315 and the search engine 318 can execute in parallel to concurrently process multiple program chunks. In some instances, the decomposer 314 can generate a plurality of program chunks, where each program chunk can be overlapping or non-overlapping relative to a remaining program chunk(s) from the plurality of program chunks. As described further herein, a plurality of chunks can be reassembled based on the search results of the respective chunks, and control flow can be reanalyzed based on the assembly of program chunks.

The binary code analysis application 312 can be configured to use the graph generator 315 to identify (e.g., parse), from the program chunk(s) generated by the decomposer 314, atoms (e.g., indivisible code units) that each defines a function call site. The function call sites can be associated with, for example, external calls to dynamically linked system libraries. To identify these function call sites (atoms) without referencing source code used to generate the binary code 304, the binary code analysis application 312 can be configured to use the map 302 to identify function call sites included in the binary code 304 (e.g., by resolving pointers).

The map 302 can be configured to provide a mapping between a binary instruction included in the binary code 304 and a tag. The tag can include, for example, an indication of computational behavior that can provide meaning to a user. For example, the tag can include an indication (e.g., an address and/or pointer) of a function associated with the binary instruction if, for example, the binary instruction includes a function call site. The map 302 can include, for example, an import address table (e.g., a registry key) that defines a list of base dynamic link libraries (DLLs) in memory. A DLL can include, for example, a library of shared function calls. The import address table can include addresses of functions associated with the DLLs and pointers associated with the function call sites (e.g., atoms) identified in the program chunks and/or binary code 304. The binary code analysis application 312 can use the import address table to resolve a pointer associated with an indirect function call site (e.g., an atom) in the binary code 304. In some instances, the map 302 can include a jump table (e.g., an indirect jump table), a shared library object, a relocation table, and/or the like. In some instances, the map 302 can include a software segment configured to dynamically load a dynamic link library (DLL) associated with the binary code 304 to determine a function associated with a call site (e.g., an atom) in the program chunk(s) and/or binary code 304. In some instances, the map 302 can include a datatype manager and/or knowledge base that is configured to track calling conventions associated with function calls. In some instances, the binary code analysis application 312 can be configured to determine a function associated with a direct system call site by using a process environment block (e.g., a data structure that includes information about a process) to determine an address of a kernel DLL.

Based on the map 302, the binary code analysis application 312 can be configured to cause a processor (e.g., the processor 220 of FIG. 2) to execute machine-readable code to retrieve one or more targets of one or more library function call sites included in the binary code 304. In some instances, the one or more targets can include one or more functions to be called, and these one or more functions can be reachable (e.g., called based on) one or more indirect jumps. The machine-readable code can include, for example, one or more indirect jump target computations configured to determine at least one memory address associated with a target (e.g., function). An indirect jump target computation can include, for example, a lookup operation within a data structure (e.g., a table) associated with the map 302 and configured to store at least one address value based on an index (e.g., a tag, pointer, etc.).

The graph generator 315 can represent the identified atoms as nodes in a graph data structure (e.g., a control flow graph). In some instances, the graph generator 315 can generate a control flow graph for each program chunk generate by the decomposer 314. This graph data structure can represent instruction paths (e.g., edges) between nodes (e.g., atoms) that can be traversed during execution of the program. For example, the graph data structure can represent a temporally ordered sequence of function calls implemented by the function call sites (e.g., atoms) included in a program chunk. A control flow graph can be traversed (e.g., searched) by a search engine (e.g., the search engine 318), as described herein.

To generate the search engine 318 to search the control flow graph(s) described above, the binary code analysis application 312 can include the compiler 316. The compiler 316 can include a compiler and/or interpreter configured to convert the specification 306 (e.g., code written in a high-level language (e.g., a domain-specific language and/or a language associated with source code)) into machine language code (e.g., object code) that implements the search engine 318 and that can be executed by a processor (e.g., the processor 220 of FIG. 2). In some implementations, the compiler 316 can include a compiler configured to translate the specification 306, which can define a behavior pattern, into an efficient search through a graph for instances that match that behavior. In some implementations, although not shown in FIG. 3, an interpreter can be used instead of the compiler 316. The interpreter can be configured to parameterize a data structure to generate and/or enable the search engine 318. For example, the interpreter can cause a program (e.g., the search engine 318) to traverse a behavior pattern defined in the specification 306 while concurrently or contemporaneously searching for that pattern in object code (e.g., code representing a control flow graph).

After the machine code and/or a data structure(s) that implements the search engine 318 has been generated by the compiler 316, the binary code analysis application 312 can use the search engine 318 to search the control flow graph(s) to identify a control flow pattern(s) defined by the specification 306. To search a control flow graph, the search engine 318 can begin at a first atom (e.g., node) in the control flow graph and perform a graph search by traversing all paths that lead to remaining atoms in the control flow graph. The search engine 318 can be configured to indicate a match if the search engine 318 can connect atoms in an arrangement that is described by a pattern definition included in the specification 306. The resulting slices can be execution paths (sequences of instructions in execution order) or subprograms if they match conditional control flow constructs in the pattern. By searching the control flow graph(s), the search engine 318 can search for a pattern/arrangement of one or more function call sites included in the binary code 304 without referencing, accessing, and/or using a source code that was used to generate the binary code 304.

In some instances, the search engine 318 can be configured to use interprocedural analysis to search the control flow graph. Similarly stated, the search engine 318 can use a divide-and-conquer strategy for a pattern being searched for. Specifically, the search engine 318 can analyze each individual function represented in the control flow graph and identify any matches or partial matches based on the pattern specified in the specification 306. The search engine 318 can excise any remaining unmatched portions of the control flow graph that are irrelevant to (e.g., unassociated with) the specification 306 for that function. The resulting reduced control flow graph can be smaller than the control flow graph that represents an entire program. Using the reduced control flow graphs, the entire pattern (e.g., a pattern associated with multiple functions) can be reassembled (e.g., "knit together") and reevaluated. The process of matching portions of the pattern within each function can be referred to as intraprocedural analysis, and the process of matching the pattern that spans multiple functions can be referred to as interprocedural analysis. The results of the interprocedural analysis can be available later than the results of the intraprocedural analysis, but in at least some instances, the results of the interprocedural analysis can find behavior patterns that would not be detected with intraprocedural analysis alone (e.g., without interprocedural analysis).

Where a pattern has a hierarchical structure and includes a plurality of sub-patterns, each sub-pattern can have its own separate definition, scope and namespace for pattern variables. An atom in the specification can include a sub-pattern (e.g., another pattern), and the search engine 318 can be configured to search that sub-pattern to determine whether the appropriate section of the control flow graph is associated with a pattern of interest (e.g., as defined by the specification 306). Data computed and stored in memory by binary code 304 (if certain paths were to be executed) that is associated with data-flow constraints in a pattern and/or sub-pattern described in specification 306 can be associated with a pattern variable (e.g., a variable defined and referenced in the specification 306 rather than the binary code 304) to establish a relationship between values that data in code 304 would take on if certain paths were to be executed, and data-flow constraints in patterns, sub-patterns, and/or atoms in the specification 306. Pattern variables in different levels of the hierarchical structure in the specification 306 can be subject to alpha-renaming to avoid name clashes. As a result of the search engine 318 identifying a control flow pattern as a candidate path and combining different paths at different levels of the pattern hierarchy, the search engine 318 can apply additional assertions of equality and/or other logical constraints to the pattern variables that are passed between levels of the pattern hierarchy, to describe data flow details of the behavior pattern.

By way of example of the interprocedural analysis described above, where (1) a control flow graph represents an entire program and/or many instructions and (2) a pattern spans beyond a single function boundary (e.g., the pattern is associated with more than one function call sites), it can be computationally intensive to search the control flow graph for the pattern. Thus, to preserve compute resources, the search engine 318 can be configured to analyze the control flow graph based on a single function (from a plurality of functions) at a time to detect the pattern. As a result of the search engine 318 determining a match between the specified function and an atom in the control flow graph of a single function, the search engine 318 can be configured to search additional atoms based on a portion(s) of the pattern described in the specification 306 beyond the boundary of the single function. This portion(s) of the pattern can include, for example, an additional function(s).

As a result of the search engine 318 identifying a pattern (e.g., at least one atom) as defined by the specification 306, the binary code analysis application 312 can generate a binary code slice 308. The binary code slice 308 can indicate, for example, an execution path of atoms from the control flow graph that reflects the defined pattern (e.g., the arrangement of code). The dataflow analysis software component 320 can use the binary code slice 308 to determine whether the binary code slice 308 satisfies one or more constraints, as described herein at least in relation to FIG. 4. In some instances, although not shown in FIG. 3, the binary code analysis application 312 can be configured to output the binary code slice 308 to a user and/or an external application (e.g., without using the dataflow analysis software component 320 to process the binary code slice 308). In some implementations, the binary code analysis application 312 can be further configured to output a Boolean indication (e.g., an alert, signal, and/or notification) indicating that the binary code 304 is, for example, either benign (e.g., based on no defined pattern being found) or malicious (based on a pattern being found). The signal can be configured to cause, for example, display (e.g., via a graphical user interface (GUI)) of an alert, a description of a portion of the specification 306 that matched a portion of the binary code 304, and/or the like. In some implementations, the signal can be sent to a compute device (e.g., the compute device 120 of FIG. 1) to prevent that compute device from executing the binary code 304. In some implementations, the binary code analysis application 312 can be configured to automatically (e.g., without human intervention) cause the binary code slice 308 to be modified, such that the resulting modified binary code does not exhibit a pattern (or, alternatively, exhibits a pattern) as defined in the specification 306. As a result, the modified binary code can be prevented from implementing the predetermined software action.

The binary code analysis application 312 can be configured to send the binary code slice 308 to the dataflow analysis software component 320 for further processing. Specifically, after the binary code analysis application 312 has used the control flow analysis software component 313 to generate a binary code slice 308 that reflects a pattern as defined by the specification 306, the binary code analysis application 312 can use the dataflow analysis software component 320 to evaluate whether the binary code slice 308 satisfies a constraint(s) defined in the specification 306. As a result of the use of the control flow analysis software component 313 generating the binary code slice 308, the dataflow analysis software component 320 can analyze a reduced problem size (e.g., the binary code slice 308, which can be a smaller portion of the binary code 304). Thus, as opposed to an application that performs control flow analysis and dataflow analysis concurrently and/or simultaneously, which can be computationally intensive, the binary code analysis application 312 can conserve compute resources by performing control flow analysis and dataflow analysis in succession. The dataflow analysis is described further in relation to FIG. 4 below.

Figure 4:
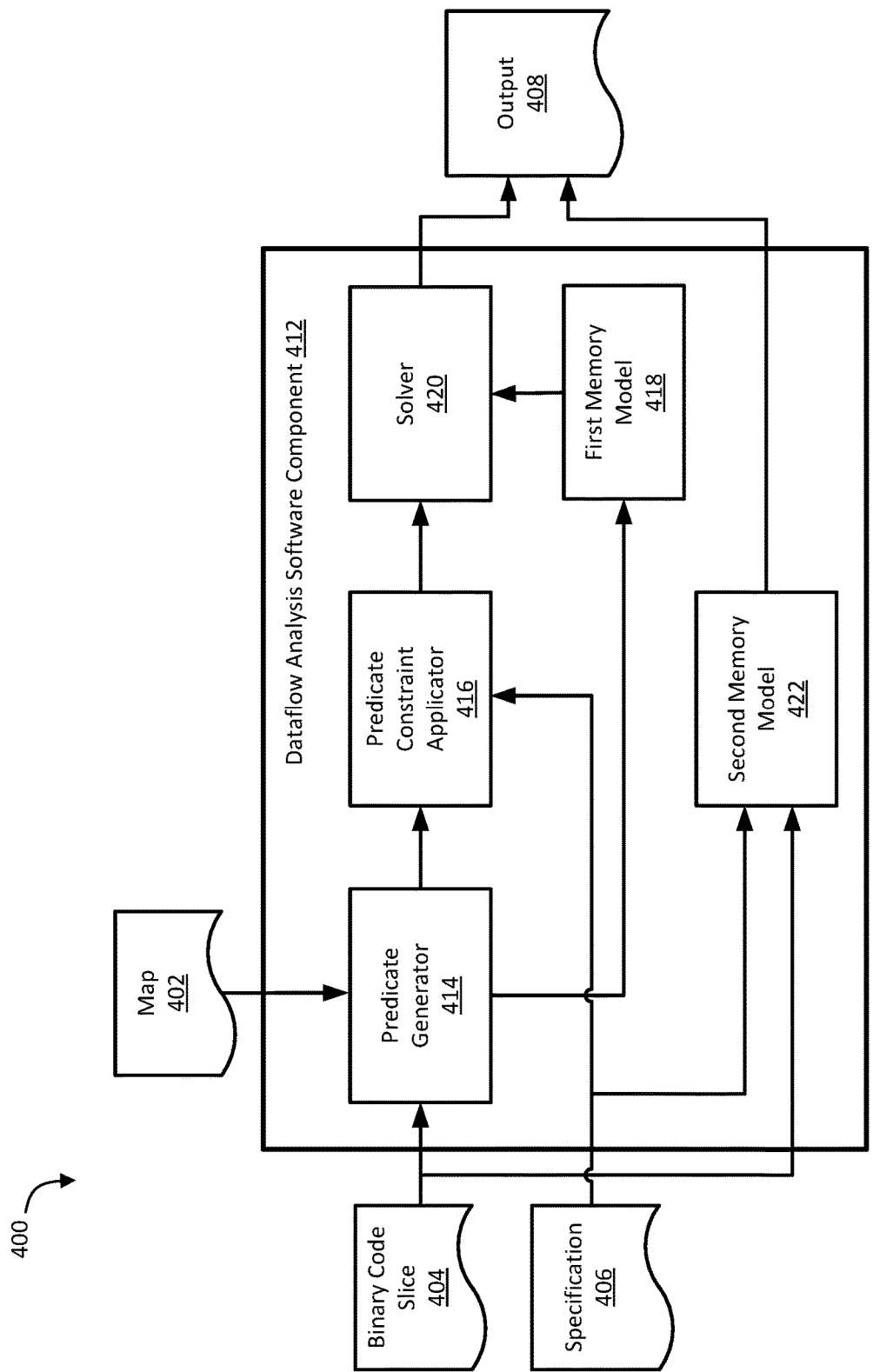
FIG. 4 is a second schematic diagram of software code segments included in a binary code analysis system, according to an embodiment.

FIG. 4 is a schematic diagram of software code segments 400 associated with a binary code analysis system (e.g., a system functionally and/or structurally similar to the binary code analysis system 100 of FIG. 1), according to an embodiment. The software code segments 400 can be associated with a compute device (e.g., a compute device that is structurally and/or functionally similar to the compute device 201 of FIG. 2 and/or the compute device 110 of FIG. 1). In some instances, for example, the software code segments 400 can be implemented in software stored in memory 210 and configured to execute via the processor 220 of FIG. 2. In some instances, for example, at least a portion of the software code segments 400 can be implemented in hardware. The software code segments 400 can include a map 402, binary code slice 404, a specification 406, a dataflow analysis software component 412, and an output 408. The dataflow analysis software component 412 can be structurally and/or functionally equivalent to the dataflow analysis software component 320 of FIG. 3.

The dataflow analysis software component 412 can be configured to analyze a variable(s) (e.g., a local variable, a global variable, and/or a function call parameter) included in the binary code slice 404 based on the map 402 and a constraint(s) defined in the specification 406. As described above, the binary code slice 404 can be generated by a control flow analysis software component (e.g., the control flow analysis software component 313 of FIG. 3). For example, in some instances, the binary code slice 404 can be the binary code slice 308 of FIG. 3.

The map 402 can be functionally and/or structurally equivalent to the map 302 of FIG. 3. In some instances, as shown in FIG. 3, the map 302 can be the map 402, such that the same map is provided as input to each of a control flow analysis software component (e.g., control flow analysis software component 313 of FIG. 3) and the dataflow analysis software component 412. Similarly, the specification 406 can be functionally and/or structurally equivalent to the specification 306 of FIG. 3. In some instances, as shown in FIG. 3, the specification 306 can be the specification 406, such that the same map is provided as input to each of a control flow analysis software component (e.g., control flow analysis software component 313 of FIG. 3) and the dataflow analysis software component 412.

The specification 406 can include code associated with a domain-specific programming language (as described in relation to, for example, FIG. 4) and can be defined by a user to describe/specify a dataflow constraint. For example, the user can define a constraint on an argument to identify (e.g., based on the constraint being satisfied or violated) arguments and/or system call sites associated with a predetermined software action of interest. The dataflow analysis software component 412 can use the specification 406 as input to determine circumstances in which the execution of the binary code slice 404 would satisfy the dataflow constraint. The specification 406 can be functionally and/or structurally (e.g., as to format, syntax, semantics, and/or the like) equivalent to the specification 506 of FIG. 5 described below. A dataflow constraint can be represented by, for example, an arithmetic operation, a logical operation, a bitwise operation, a metafunction (described herein), and/or the like. The dataflow constraint can be associated with an argument passed to a function via a function call site defined within the binary code slice 404.

The dataflow analysis software component 412 can include a predicate generator 414, a predicate constraint applicator 416, a first memory model 418, a solver 420, and a second memory model 422.

Based on the map 402, the dataflow analysis software component 412 can be configured to cause a processor (e.g., the processor 220 of FIG. 2) to execute machine-readable code to retrieve one or more targets of one or more library function call sites included in the binary code slice 404. In some instances, the one or more targets can include one or more functions to be called, and these one or more functions can be reachable (e.g., called based on) one or more indirect jumps. The machine-readable code can include, for example, one or more indirect jump target computations configured to determine at least one memory address associated with a target (e.g., function). An indirect jump target computation can include, for example, a lookup operation within a data structure (e.g., a table) associated with the map 402 and configured to store at least one address value based on an index (e.g., a tag, a pointer, etc.). Having used the map 402 to identify a library functional call site within the binary code slice 404, the dataflow analysis software component 412 can use the map 402 to identity variables within the binary code slice 404 associated with the library function call site. For example, based on a predefined calling convention associated with the identified library function call site, the dataflow analysis software component 412 can identify a library function call site(s), along with an argument(s) to be passed to the library function via the library function call site. Having identified the variable(s) (e.g., argument(s)), the dataflow analysis software component 412 can use the predicate generator 414 to generate a predicate set, converting any mutable variables into immutable variables.

The predicate generator 414 can be configured to generate a predicate set based on the binary code slice 404. More specifically, the predicate generator 414 can be configured to convert the instructions of the binary code slice 404 to code (e.g., the predicate set) having a static single-assignment (SSA) form, such that any program variables that are defined by the binary code slice 404 and that are mutable can be replaced with immutable variables and included in the code having the SSA form. The predicate set can also represent computational effects of the instructions in the binary code slice 404 as a logical predicate. A predicate can represent (e.g., mirror) the effects of a code segment. For example, an instruction included in the binary code slice 404 can assign the variable x a value of three. In the predicate set, predicate associated with the instruction can represent the effects of this assignment. By default (e.g., before any constraints are applied, as described herein), values can be assigned to the representation of variables in the program within the predicate at each computational step in the program that cause the predicate to be satisfiable, i.e., evaluate to a value of true. As described below, if a constraint (as specified in the specification 406) is applied to the variable x at a particular point in the program, the predicate can evaluate to false if the variable assignment at that point violates the constraint or, alternatively, continue to return a value of true if the variable assignment does not violate the constraint. For example, if the constraint specifies that the variable x cannot be greater than two, and the variable x has a value of three, the condition would violate the constraint. As a result of the constraint violation, the predicate associated with the instruction and included in the predicate set would evaluate to a value of false. The net effect of the predicate generator 414 is that the predicate it generates can be used to determine whether any inputs and/or environmental conditions under which executing the program would satisfy the constraints placed upon the data flowing within the program.

An immutable variable can include a variable that is assigned a value once and is defined before it is used (e.g., within an operation, function, instruction, etc.). In some instances, a mutable variable can be replaced with two or more immutable variables, and each of the two or more immutable variables can have unique names. An immutable variable can be evaluated against a constraint at a given point of execution without needing to be revisited at a later point of execution. Thus, unlike a mutable variable that can have different value assignments at different execution points of the binary code slice 404, an immutable variable can be evaluated without tracking mutations, which can improve memory, bandwidth, and/or processor usage.

To generate immutable variables within a predicate set, the predicate generator 414 can be configured to assign an index at any point within the binary code slice 404 where a mutable variable is mutated (e.g., reassigned a value). The index can be carried through to any subsequent uses of the mutable variable until the mutable variable is mutated again, at which point a new index can be assigned. As a result of the indices, a mutation (from a plurality of mutations, each associated with a unique index) of the mutable variable can be assigned to a unique immutable variable within the predicate set, such that the predicate set can maintain (e.g., emulate) the functionality of the binary code slice 404 while excluding mutable variables.

For the purpose of illustration, the binary code slice 404 can cause, for example, a first value to be assigned to a variable (e.g., a memory location) in a first instruction. In a second instruction subsequent to the first instruction, the binary code slice 404 can cause a second value to be assigned to the variable, replacing the first value. Thus, the variable as defined in the binary code slice 404 is mutable. The predicate generator 414 can be configured to generate a predicate set that includes an additional variable to which the second value can be assigned, excluding the variable from reassignment following its assignment of the first value. The predicate set can use the additional variable in subsequent instructions and, as a result, can maintain a functionality of the binary code slice 404 without reassigning the variable.

In some instances, the binary code slice 404 can define a loop including a loop body having at least one instruction. The instructions of the loop body can be called during multiple execution iterations of the loop, and in some instances, the instructions can include a variable(s) that changes assignment (e.g., is mutated) in one execution iteration as compared to another (e.g., subsequent or prior) execution iteration. For example, a variable can evolve (e.g., iterate) after each successive execution iteration of the loop. In some instances, the instructions of the loop body can be constrained differently by the predicate constraint applicator 416 (described herein) between a first execution iteration and a second execution iteration. As a result, the predicate generator 414 can be configured to "unroll" the loop by duplicating (e.g., copying) at least a portion of the loop body, converting any mutable variables into immutable variables within the respective portions, and/or assigning the duplicate portions to different memory locations so that the loop body portions can be independently constrained. In doing so, the predicate generator 414 can be configured to generate a plurality of loop invariants from a loop having mutable variables.

Given the generated predicate set, the dataflow analysis software component 412 can be configured to use the predicate set as input to the predicate constraint applicator 416 to identify binding locations for the constraints defined in the specification 406. The predicate constraint applicator 416 can be configured to bind a constraint defined within the specification 406 to a memory location associated with a variable included within the binary code slice 404 and represented as an immutable variable within the generated predicate set. Specifically, the predicate constraint applicator 416 can be configured, for example, map variables within a program to constraints. For example, for the program P having variables $x\_1, x\_2, y\_1, y\_2, \ldots y\_7, z\_1, \ldots$ and for constraints C1 (e.g., to be applied to $x\_2$ and $y\_7$) and C2, the predicate constraint applicator 416 can be configured to define an expression $P(x\_1, x\_2, y\_1, y\_2, \ldots, z\_1, \ldots) \wedge C1(x\_2, y\_7) \wedge C2(\ldots)$ that can be evaluated using a memory model that represents addressable memory, as described below. As described above, the memory location (e.g., the memory location of an argument to be constrained) can be identified based on the map 402. If multiple immutable variables were generated based on a mutable variable included in the binary code slice 404, the memory location can be identified based on the specific immutable variable to be constrained and as defined by the predicate set, such that the constraint can be evaluated at any point within the binary code slice 404 that a mutable variable is called. As a result of binding the defined constraints to the memory locations, the predicate constraint applicator 416 can generate a constrained predicate set. The constrained predicate set can include a logical constraint (as defined by the specification 306) associated with (e.g., bound to) a variable as an assertion, the logical constraint attached to an appropriate location in the program (e.g., at a specific mutation of the variable as represented in the binary code slice 404).

In some instances, the binary code slice 404 can include an instruction that implements a pointer dereferencing operation. A pointer dereferencing operation can be configured to determine an object and/or value pointed to by a pointer (e.g., a reference to a memory location). A dereferencing operation can produce a result that can, in some instances, be undefined at the time of static analysis and/or at the time of generating the predicate set. To account for pointer dereferencing operations, the dataflow analysis software component 412 can be configured to build (e.g., generate, parameterize, etc.) the first memory model 418 using the logic of any uninterpreted predicates associated with any pointer dereferencing operations. The first memory model 418 can include a memory model that can store and track a possible value(s) that a memory read operation implemented by the binary code slice 404 can return. For example, a first instruction, included in the binary code slice 404 and represented by a first predicate in the predicate set, can be configured to cause a value to be written to a memory location. The dataflow analysis software component 412 can be configured to automatically cause an update to the first memory model 418 in response to determining that the first instruction causes a value to be written to the memory location. For example, the value can be stored within the first memory model 418 at an index associated with memory location. The first memory model 418 can then return the value based on a query that indicates the memory location. For example, a second instruction that is included in the binary code slice 404 and that is to be executed subsequent to the first instruction can cause the value (previously written as a result of the first instruction) to be read from the memory location. During static analysis (e.g., without executing the first instruction and the second instruction), the dataflow analysis software component 412 can be configured to query, based on the memory location, the first memory model 418 to retrieve the value and interpret the second instruction.

Using the first memory model 418, symbolic addresses and/or symbolic variables, having concrete values that can be unknown at static analysis time, can be tracked, constrained, and/or evaluated. In some implementations, the dataflow analysis software component 412 can be configured to place additional assertions within the predicate set and/or the constrained predicate set. The additional assertions can link the first memory model 418 to any uninterpreted predicates, such that constraints can applied when sufficient information is available to determine the result of the pointer dereferencing operation (e.g., during constraint evaluation process performed by the solver 420, described herein). For the purpose of illustration, the example instruction "mov $0x10(% eax), (% esp)" might be represented using the uninterpreted predicate "mem(esp_i)=mem(0x10+eax_i), where mem is an uninterpreted predicate (e.g., a black box function whose internal details are not known and/or expressed). This uninterpreted predicate could then be simplified following concretization. In some instances, the first memory model 418 can be built to track constraints that are implied by logic variables. To illustrate such a first memory model 418, given an example 5-element memory space, example instructions can include "mov 0x3, % eax" and "mov 0x7, (% eax)." The predicate generator 414 can convert these instructions into a logical predicate using an uninterpreted predicate "mem" as a memory model. The memory model can be represented as "eax=0x3∧ mem(eax)=0x7," which after constant propagation, can become "eax=0x3∧mem(0x3) 0x7." Alternatively, memory can be represented as an array (e.g., {mem1, mem2, mem3, mem4, mem5}, such that the example instructions can be converted to the predicate "{mem1, mem2, mem3, mem4, mem5}[0x3]=0x7," and after simplification, "eax=0x3∧mem3=0x7."

Given (1) the constrained predicate set representing the defined constraints as applied to variables of the binary code slice 404 and (2) the first memory model 418 tracking any unresolved variables associated with, for example, a pointer dereferencing operation, the solver 420 can be configured to determine whether the variables can have at least one set of concrete values (e.g., the binary code slice 404 can have at least one possible execution) that can satisfy the constraints. The solver 420 can include solver software that implements, for example, a satisfiability modulo theory (SMT) solver. Specific implementations of the solver 420 can include, for example, a Z3 Theorem Prover and/or the like.

In some instances, a constraint can be evaluated without using the solver 420. For example, a variable associated with the constraint can have a known value and/or a known address at the time of static analysis (e.g., at a time contemporaneous to the generating of the predicate set and/or the constrained predicate set). An example of such a constraint can include, for example, a variable having a string datatype. The second memory model 422 can be configured to evaluate whether the variable having the known value and/or known address satisfies the constraint(s) defined within the constraint specification. Given that the variable is known (e.g., fixed and/or concrete), the evaluation of the constraint as applied to such a variable can be simpler as comparted to evaluating a constraint as applied to a variable that can have a range of variables; as a result, the second memory model 422 can evaluate a known variable without using the solver 420, which can improve usage of memory, bandwidth, and/or processing resources.

As a result of using the solver 420 to determine that the binary code slice 404 includes a variable that satisfies a constraint(s) defined by the specification 406, the dataflow analysis software component 412 can be configured to automatically cause generation of the output 408. The output 408 can include, for example, a signal that indicates that the binary code slice 404 is associated with a predetermined software action (e.g., an undesired software action associated with malware). The output 408 can also include at least one set of at least one concrete (e.g., fixed) value that can be assigned to a constrained variable(s) to satisfy the defined constraint(s) and during at least one possible execution of the binary code slice 404. In some implementations, the output 408 can also include a program slice that includes the constrained variable(s) that are determined to satisfy the defined constraint(s). In some implementations, the dataflow analysis software component 412 can be configured to automatically (e.g., without human intervention) cause the binary code slice 404 to be modified, such that the resulting modified binary code excludes any variable and/or expression that satisfies a defined constraint. As a result, the modified binary code can be prevented from implementing the predetermined software action.

Figure 5:
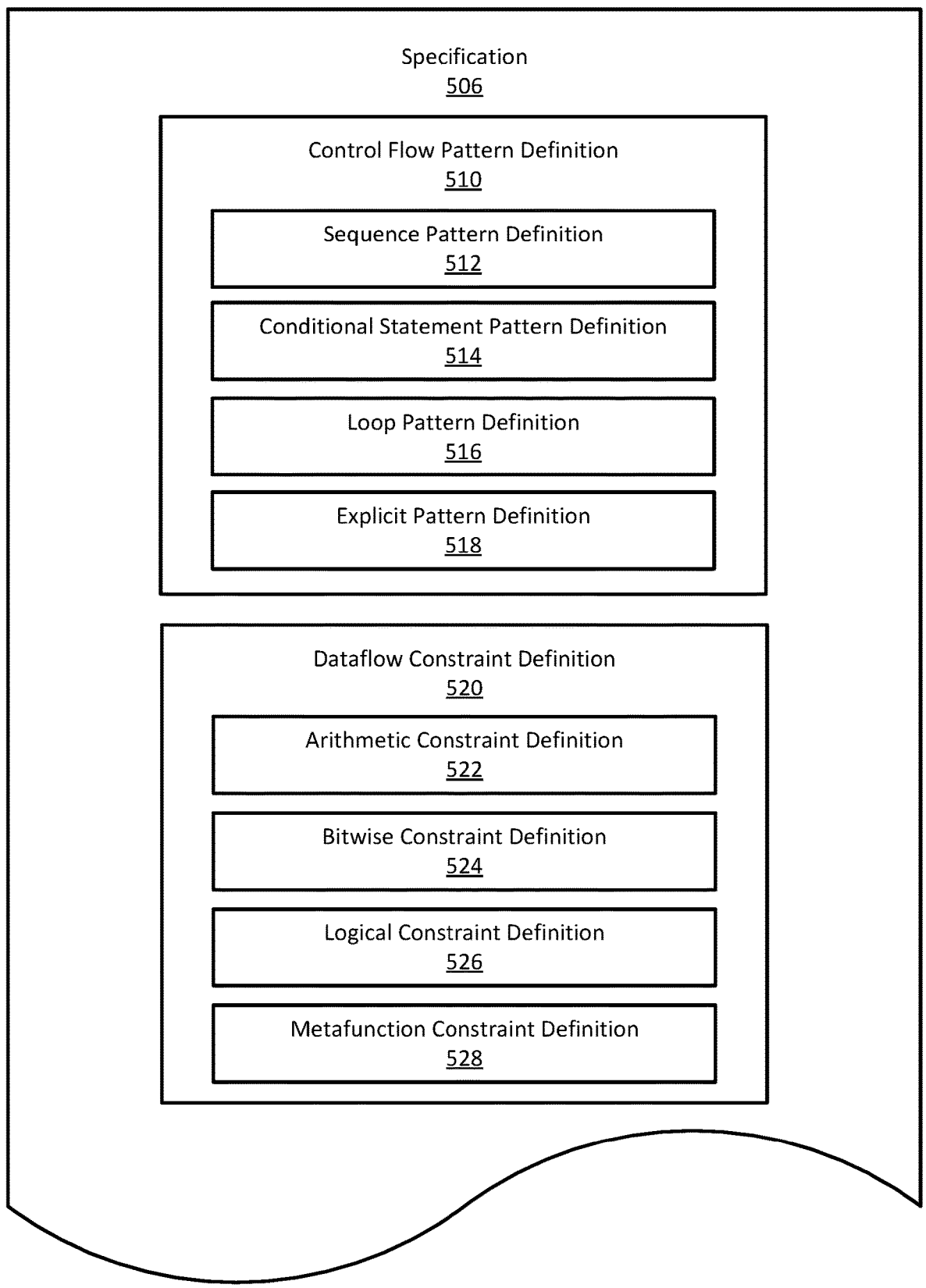
FIG. 5 is a schematic diagram of a specification used by a binary code analysis system to detect control flow patterns and evaluate constraints, according to an embodiment.

FIG. 5 is a schematic diagram of a specification 506 used by a binary code analysis system (e.g., the binary code analysis system 100 of FIG. 1) to detect control flow patterns and/or apply and evaluate constraints, according to some embodiments. At least a portion of the specification 506 can be functionally and/or structurally (e.g., as to format) equivalent to the specification 306 of FIG. 3 and/or the specification 406 of FIG. 4.

In some instances, the specification 506 can include a machine-readable description of a software behavior and/or action that combines control flow and dataflow definitions and/or restrictions. For example, the specification 506 can describe a sequence using first syntactic elements [a~>b~>c], where a, b, and c can each be a function call into a different operating system dynamic library. Additionally, the specification 506 can define constraints on parameters to those function calls at respective call sites, These constraints can be defined using second syntactic elements such as, for example, a(x) where x==3, b(y) where y==x+20, and c(z) where strcmp((char*)z,"/usr/bin/bash")==0. The first syntactic elements and the second syntactic elements can each be associated with a Backus-Naur form, such that the first syntactic elements and the second syntactic elements can be associated with a common, domain-specific language. For example, the specification 506 can describe a pattern representing the combination of the first syntactic elements and the second syntactic elements using the combined syntax [a(x)~>b(y)~>c(z)] where x==3∧y==x+20∧strcmp((char*)z,"/usr/bin/bash")==0.

In some instances, the specification 506 can assign a name to such a pattern, such that the pattern can be invoked (e.g., elsewhere within the specification 506) as an atom of another pattern. As a result, the specification 506 can be configured to implement hierarchical expression and/or reuse of patterns, where each pattern can have a set of at least one output that can be used to express bindings that can result from its match within binary code and which can be used at a higher pattern level, as described herein. By way of example, a pattern named P that can bind one of its pattern variables can be expressed as part of a sequence using the syntax [a(x)~>P{y}~>c(z)] where x==3∧y==x+20∧strcmp ((char*)z,"/usr/bin/bash")==0. In this example, the center element in the sequence, P{y}, is a pattern (e.g., another sequence of atoms and/or dataflow constraints on those atoms) rather than, for example, a function call into a system library. In some instances, a different syntax can be used to indicate whether can atom is a sub-pattern or an external function call.

The specification 506 can include, for example, descriptive code and/or a machine-readable specification that defines, for example, computational (e.g., control flow) patterns and/or predetermined software actions (e.g., behaviors associated with malware, vulnerable software, software having poor performance, etc.). Specifically, the predetermined software action can be defined by a control flow pattern definition 510 included in the specification 506. For example, the control flow pattern definition 510 can include a machine-readable control flow pattern that defines an arrangement of one or more instructions, function calls (e.g., library function calls), etc. Alternatively or in addition, the specification 506 can include a dataflow constraint definition 520, which can include, for example, descriptive code and/or a machine-readable specification that defines, for example, variables and/or expressions, that are to be bound as dataflow constraints to specific memory locations at specific points in the execution of a program implemented by binary code. These constraints can be associated with (1) arguments that can be passed across a function boundary and/or (2) any other code segment included in binary code.

The specification 506 can include a specification unit (BSU) for each specified pattern and/or each specified constraint. A BSU can include, for example, a documentation comment, a name, zero or more BSU parameters, and/or at least one rule. A documentation comment can include, for example, descriptive text that can help a reader of the specification 506 understand code/contents within. A BSU parameter can include, for example, a BSU name and/or a datatype reference annotation. The datatype reference annotation can indicate a datatype that can include, for example, a type specified in C programming language and/or a synthetic datatype associated with a BSU expression.

A BSU can cause a binary code analysis application (e.g., an application structurally and/or functionally equivalent to the binary code analysis application 212 and/or 312) to detect a match in a submitted software sample (e.g., the binary code 304 of FIG. 3) if at least one rule included in a BSU matches code segment (e.g., at least one instruction/function call) in the software sample. A rule included in a BSU can include, for example, a documentation comment, a rule name, at least one rule parameter, a pattern definition, an actions section, a location section, and/or a capture section. A pattern definition can define/specify, for example, a structure of code and/or an arrangement of instructions and/or function calls. A rule parameter can include, for example, a constraint on a value (e.g., an argument associated with a function call). In some instances, rule parameters can be unassigned and/or not given a constraint. An unassigned rule parameter can be assigned a value according to the actions section of a rule. The actions section can include at least one parameter assignment based on an expression evaluation. The location section can include one or more expressions for specifying constraints on the values of rule parameters.

The capture section of a rule can be used, for example, to a populate BSU parameter(s). The capture section can include at least one assignment from an expression(s) to a BSU parameter(s). A rule parameter can describe constraints on a value that could be found in memory if certain paths are to match the pattern, and a BSU parameter can refer to an output of the BSU. BSU parameters can be assigned values that are based on computations performed on rules parameters. A value assigned to rule parameters need not affect BSU parameters. A BSU parameter can be assigned a value in the capture section. If a BSU parameter is not assigned a value in a rule's capture section, a compiler (e.g., the compiler 316 of FIG. 3) can flag that rule as a compile error.

A control flow pattern definition 510 included in a BSU can include, for example, a sequence pattern definition 512, a conditional statement pattern definition 514, a loop pattern definition 516, and/or an explicit pattern definition 518. A dataflow constraint definition 520 included in a BSU can include, for example, an arithmetic constraint definition 522, a bitwise constraint definition 524, a logical constraint definition 526, and/or a metafunction constraint definition 528.

The sequence pattern definition 512 can specify, for example, a sequence (e.g., an ordered arrangement) of one or more sub-patterns. A sub-pattern can indicate, for example, one or more instructions and/or function calls. In some instances, a sub-pattern can be temporally arranged relative to another sub-pattern in a code segment (e.g., a processor can execute a first sub-pattern (e.g., instruction(s)) at a first time, and the processor can execute a second sub-pattern at a second time later than the first time. A rule that includes a sequence pattern definition 512 can cause a pattern analysis application to indicate a match if, for example, a software sample includes the sequence/arrangement/order of a sub-pattern(s) defined by the sequence pattern definition 512. In some instances, a sequence of at least one sub-pattern can include, for example, two sub-patterns that do not immediately follow each other (e.g., the two sub-patterns are not adjacent to each other and/or are separated by additional code, instruction(s), and/or function call(s)). For example, in some instances, a software sample can include code (e.g., code not associated with a sub-pattern and/or the sequence pattern definition 512) between detected instances of sub-patterns included in a sequence pattern definition 512. In such instances, the pattern analysis application can be configured to identify distinguished software behavior based on the non-contiguous sub-patterns. Said differently, a relationship between adjacent sub-patterns associated with a sequence pattern definition 512 can include an "eventually followed by" relationship and/or an "immediately followed by" relationship (e.g., a relationship between two contiguous sub-patterns. In some instances, the control flow pattern definition 510 can include an any-order pattern that defines a pattern of one or more instructions/function calls appearing in any order (e.g., and not in a specific order/arrangement).

A conditional statement pattern definition 514 can indicate, for example, a conditional expression pattern, an if-pattern, a then-block pattern, and/or an else-block pattern. A code segment (e.g., the binary code 304) included in a software sample can satisfy a conditional statement pattern definition 514 if, for example, (1) the branch condition of the code segment satisfies a constraint(s) imposed on the conditional expression of the conditional statement pattern definition 514, (2) the then-block of the code segment (e.g., code to be executed based on the branch condition evaluating as true) is associated (e.g., matches) with the then-block pattern of the conditional statement pattern definition 514, and/or (3) the else-block (e.g., code to be executed based on the branch condition evaluating as false) of the code segment is associated with the else-pattern of the conditional statement pattern definition 514.

A loop pattern definition 516 (e.g., a while-pattern) can include, for example, a conditional expression constraint and a do-pattern. A code segment (e.g., the binary code 304) included in a software sample can satisfy a conditional statement pattern definition 514 if, for example, (1) the condition associated with a while loop and included in the code segment satisfies the conditional expression constraint of the loop pattern definition 516, and (2) the do-block of the while loop and included in the code segment (e.g., code to be executed based on the condition evaluating as true) is associated (e.g., matches) with the do-pattern of the loop pattern definition 516.

The explicit pattern definition 518 can include for example, a call pattern definition, an instruction pattern definition, and/or a wildcard pattern definition. A call pattern definition included in a BSU can, for example, cause a pattern analysis application to identify a code segment in binary code that includes a call to a function specified by the call pattern definition. An instruction pattern definition included in a BSU can, for example, cause a pattern analysis application to identify a code segment in binary code that includes an instruction specified by the call pattern definition. A wildcard pattern definition included in a BSU can, for example, cause a pattern analysis application to identify a code segment in binary code specified by the call pattern definition.

As examples of a dataflow constraint definition 520, the arithmetic constraint definition 522 can define a constraint using an arithmetic operation (e.g., "2x+2y !=4z). The bitwise constraint definition 524 can define a constraint using a bitwise operation (e.g., a & b=1). The logical constraint definition 526 can define a constraint using a logical operation that combines different constraints (e.g., 2x+2y !=4z||a & b=1). The metafunction constraint definition 528 can include an operation that can be unassociated with (e.g., not implemented by) a standard arithmetic operation. For example, the metafunction constraint definition 528 can define a constraint using a string operation (e.g., a string concatenation), a pointer dereferencing operation, and/or similar functions.

The following example code block illustrates an example BSU:

```

description: Checks if a debugger is present and exits the
program if it is
parameters :
   - name: IsDebuggerPresent
     type: BOOL
     description: Result of call to IsDebuggerPresent

BSU_START Debugger_Present ( IsDebuggerPresent : BOOL ) :
   RULE_START
      PARAMETERS: isDebuggerPresent
      PATTERN:
         SEQUENCE: {
            CALL: isDebuggerPresent = IsDebuggerPresent ( ) ;
            if isDebuggerPresent then CALL: ExitThisProcess (_,
_);
         }
      WHERE :
         isDebuggerPresent != 0;
```

```
      CAPTURE :
         IsDebuggerPresent = isDebuggerPresent;
   RULE_END
BSU_END
```

An example of a domain-specific language that can be used to compose a BSU is shown in the example code block below. A domain-specific language (DSL) can include, for example, a language to describe some aspect of a solution for a narrowed (e.g., specific) subset of at least one application. In some instances, a domain-specific language can be distinguished from, for example, a general-purpose language that can apply broadly across a plurality of domains/applications. A domain-specific language can include custom (e.g., unique) syntax to achieve a goal and/or implementation that can be used to solve (e.g., more specifically) a problem associated with the domain. For example, a domain-specific language associated with a BSU and specific to, for example, a software analysis domain, can include syntax that describes a pattern of software behavior (e.g., a control flow pattern), and this pattern definition can be used to solve the problem of identifying distinguished software behavior. In some instances, a domain-specific language can be used to express solutions in an idiom and at a level of abstraction associated with the problem domain (e.g., software/binary code analysis). For example, the example code block below includes domain-specific syntax configured to define rules, patterns (e.g., wildcard patterns, if-patterns, while-patterns, sequence patterns, any order (e.g., unordered and/or non-order specific) patterns, call patterns, instruction patterns, etc.), parameters, and/or the like, associated with a BSU.

```
BsuModel: (bsuDecls+=BsuDecl)*;
BsuDecl :
   (docComment=Documentation)?
   'BSU_START'
   name=ID
   '(' (params+=BsuParam (',' params+=BsuParam)*)? ')' ':'
      (rules+=BsuRule)*
   'BSU_END'
;
Documentation:
   comment=DOC_COMMENT
;
BsuParam: name=ID (':' typeRef=TypeRef)?;
TypeRef: name=ID ('*')* ;
BsuRule:
   (docComment=Documentation)?
   'RULE_START'
   ('NAME:' name=ID)?
   ('PARAMETERS:' params+=RuleParam (',' params+=RuleParam)* (',')? )?
   'PATTERN:' pattern=Pattern
   ('ACTIONS:' (ruleParamAssigns+=RuleParamAssignment ';')* )?
   ('WHERE:' (guards+=Expr ';')* )?
   ('CAPTURE:' (bsuParamAssigns+=BsuParamAssignment ';')* )?
   'RULE_END'
;
RuleParamAssignment:
   target=RuleParamRef '=' source=Expr
;
RuleParamRef : param=[RuleParam];
BsuParamAssignment:
   target=BsuParamRef '=' source=Expr
;
BsuParamRef : param=[BsuParam];
RuleParam: name=ID (':' typeRef=TypeRef)?;
Pattern :
   WildcardPattern |
   IfPattern |
   WhilePattern |
   SequencePattern |
   AnyOrderPattern |
```

```
    BsuCallPattern |
    ExtCallPattern |
    InstructionsPattern
;
WildcardPattern: {WildcardPattern} '_';
IfPattern :
    'if' condition=Expr 'then' thenPat=Pattern (=> 'else' elsePat=Pattern)?
;
WhilePattern :
    'while' condition=Expr 'do' doPat=Pattern
;
SequencePattern :
    'SEQUENCE:' '{' (patterns+=Pattern ';')+ '}'
;
AnyOrderPattern :
    'ANY_ORDER:' '{' (patterns+=Pattern ';')+ '}'
;
BsuCallPattern :
    'BSU:' bsu=[BsuDecl] '(' (args+=Expr (',' args+=Expr)*)? ')'
;
ExtCallPattern :
    'CALL:' (return Val=RuleParamRef '=')?
        funcRef=ExtFuncRef '(' (args+=Expr (',' args+=Expr)*)? ')'
;
ExtFuncRef: name=ID ;
InstructionsPattern :
    'INSTRUCTIONS:' '{' (instructions+=STRING ';')+ '}'
;
Expr:
    UnaryApplyExpr |
    InfixExpr
;
UnaryApplyExpr:
    operator=UnaryOperator arg=Expr
;
UnaryOperator :
    '*' | // Pointer-deference operator
    '&' | // Address-of operator
    '!' | // Boolean negation operator
    '-' // Numeric negation operator
;
InfixExpr:
    left=QualifiedExpr (oper=InfixOperator right=Expr)?
;
QualifiedExpr:
    qualifier=ExprPrimary (selectors+=ElementSelector)*
;
ElementSelector :
    ListElementSelector |
    FieldElementSelector
;
ListElementSelector:
    '[' index=Expr ']'
;
FieldElementSelector:
    '.' field=ID
;
ExprPrimary :
    FunctionApplyExpr  |
    RuleParamRef       |
    VarLengthArg       |
    WildcardExpr       |
    StringExpr         |
    BoolExpr           |
    IntExpr            |
    HexExpr            |
    ParenExpr          |
;
FunctionApplyExpr:
    '@' funcRef=MetaFuncRef '(' (args+=Expr (',' args+=Expr)*)? ')'
;
MetaFuncRef: name=ID ;
VarLengthArg :
    {VarLengthArg} '...' param Ref=RuleParamRef?
;
WildcardExpr :
    {WildcardExpr} '_'
;
StringExpr :
```

```
   value=STRING
  ;
  BoolExpr :
     isTrue ?= 'true' |
     isFalse ?= 'false'
  ;
  IntExpr :
     value=INT
  ;
  HexExpr :
     value=HEX
  ;
  ParenExpr :
     '(' innerExpr=Expr ')'
  ;
  InfixOperator:
     '&&' | // AND boolean operator
     '||' | // OR boolean operator
     '==' | // EQUALS operator
     '!=' | // NOT EQUALS operator
     '>=' | // GREATER THAN OR EQUAL TO operator
     '<=' | // LESS THAN OR EQUAL TO operator
     '>' | // GREATER THAN operator
     '<' | // GREATER THAN operator
     '+' | // PLUS operator
     '-' | // SUBTRACT operator
     '*' | // MULTIPLICATION operator
     '/' | // DIVIDE operator
     '%' | // MODULO operator
  ;
  terminal HEX:
     ('0x'|'0X') ('0'..'9']'a'..'f'|'A'..'F'|'_')+
     ('#' (('b'|'B')('i'|'I') | ('l'|'L')))?;
  terminal DOC_COMMENT : '###' -> '###';
```

Figure 6A:
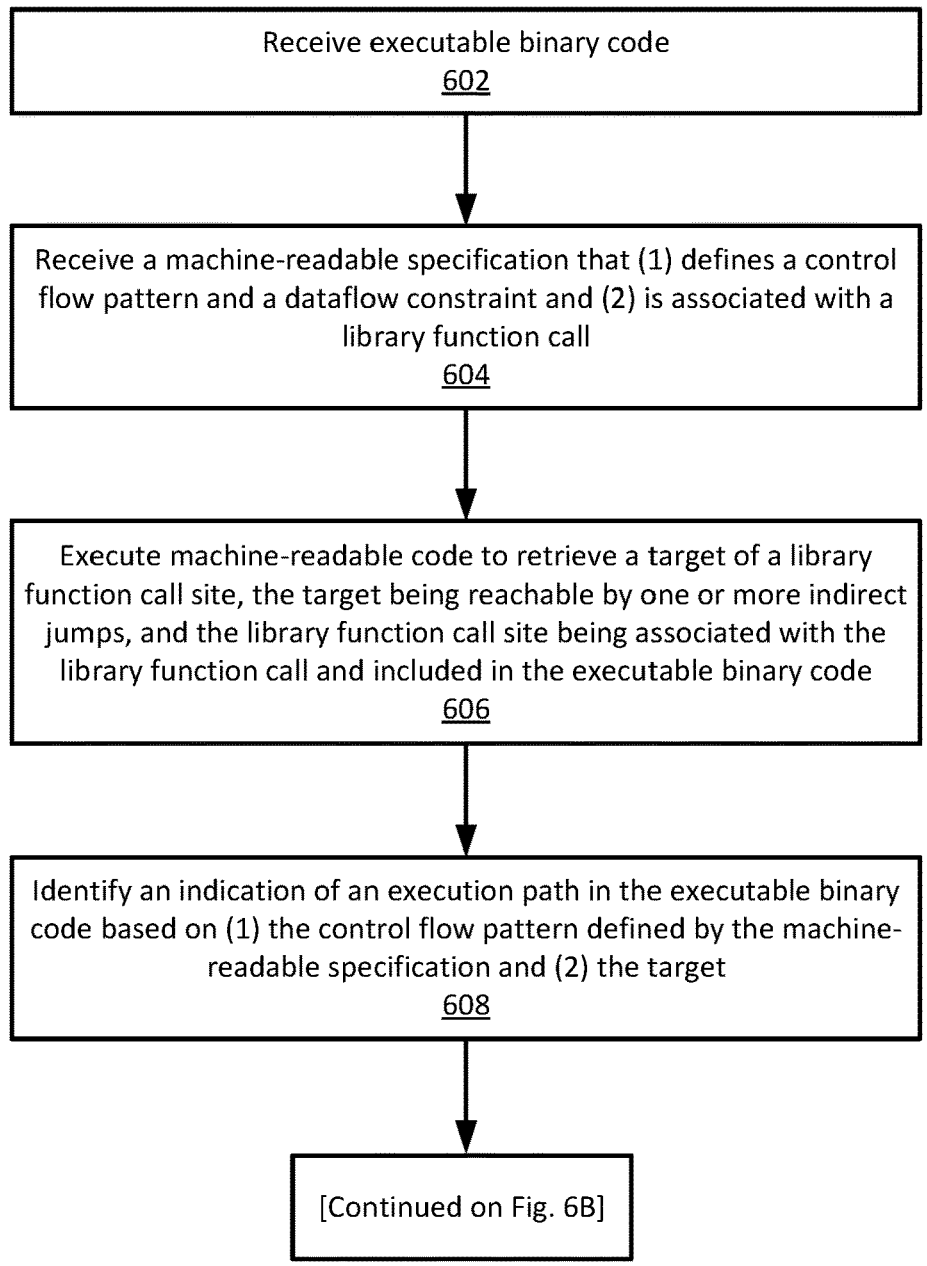
FIGS. 6A-B are flow diagrams collectively showing a method for at least one of identifying an execution path based on a control flow pattern or determining that an argument satisfies a constraint, according to an embodiment.
Figure 6B:
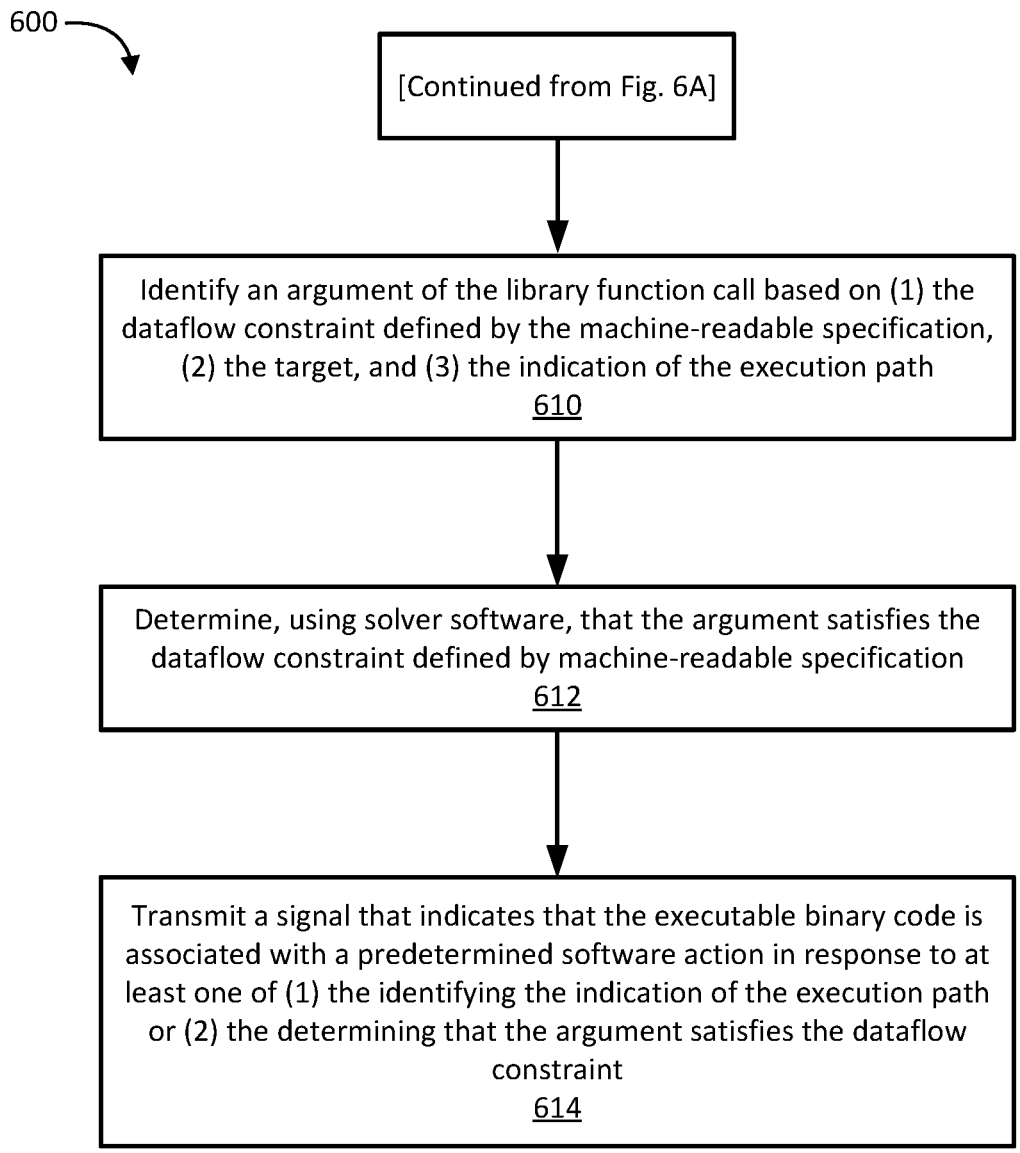

FIGS. 6A-B are flow diagrams collectively showing a method 600 for at least one of identifying an execution path based on a control flow pattern or determining that a memory location in the system at a particular point in execution satisfies a constraint, according to an embodiment. The method 600 can be implemented by a binary code analysis system described herein (e.g., the binary code analysis system 100 of FIG. 1). Portions of the method 600 can be implemented using a processor (e.g., the processor 220 of FIG. 2) of any suitable compute device (e.g., the compute device 110 of FIG. 1 and/or the compute device 201 of FIG. 2).

At 602, the method 600 includes receiving executable binary code, and at 604, the method 600 includes receiving a machine-readable specification that (1) defines a control flow pattern and a dataflow constraint and (2) is associated with a library function call. At 606, machine-readable code is executed to retrieve a target of a library function call site, the target being reachable by one or more indirect jumps, and the library function call site being associated with the library function call and included in the executable binary code. An indication of an execution path in the executable binary code is identified at 608 based on (1) the control flow pattern defined by the machine-readable specification and (2) the target. At 610, an argument of the library function call is identified based on (1) the dataflow constraint defined by the machine-readable specification, (2) the target, and (3) the indication of the execution path. At 612, a determination is made, using solver software, that the argument satisfies the dataflow constraint defined by machine-readable specification. A signal that indicates that the executable binary code is associated with a predetermined software action is transmitted at 614 in response to at least one of (1) the identifying the indication of the execution path or (2) the determining that the argument satisfies the dataflow constraint.

Figure 7A:
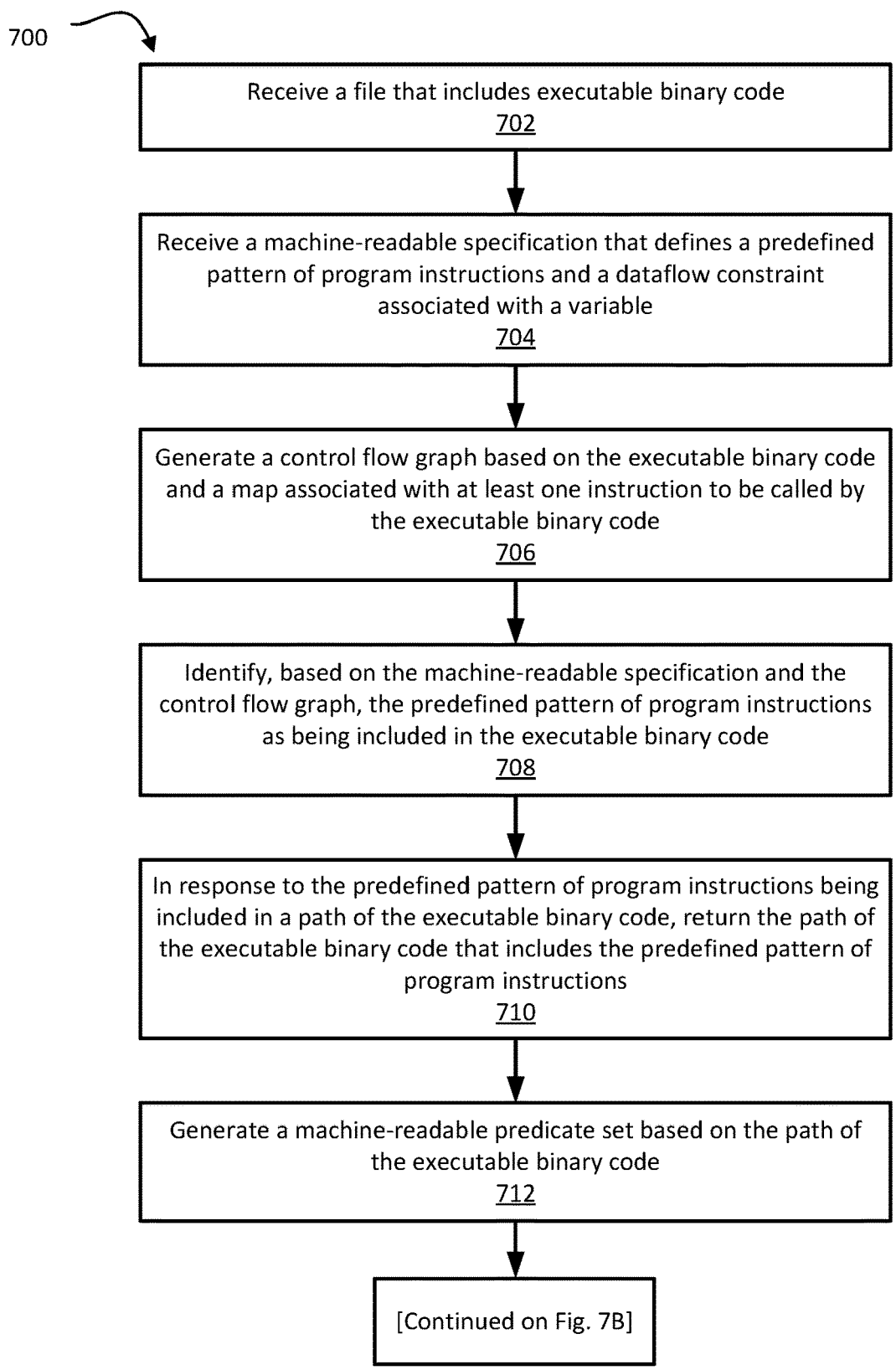
FIGS. 7A-B are flow diagrams collectively showing a method for generating a determination that executable binary code includes a predefined pattern of program instructions that satisfies a dataflow constraint, according to an embodiment.
Figure 7B:
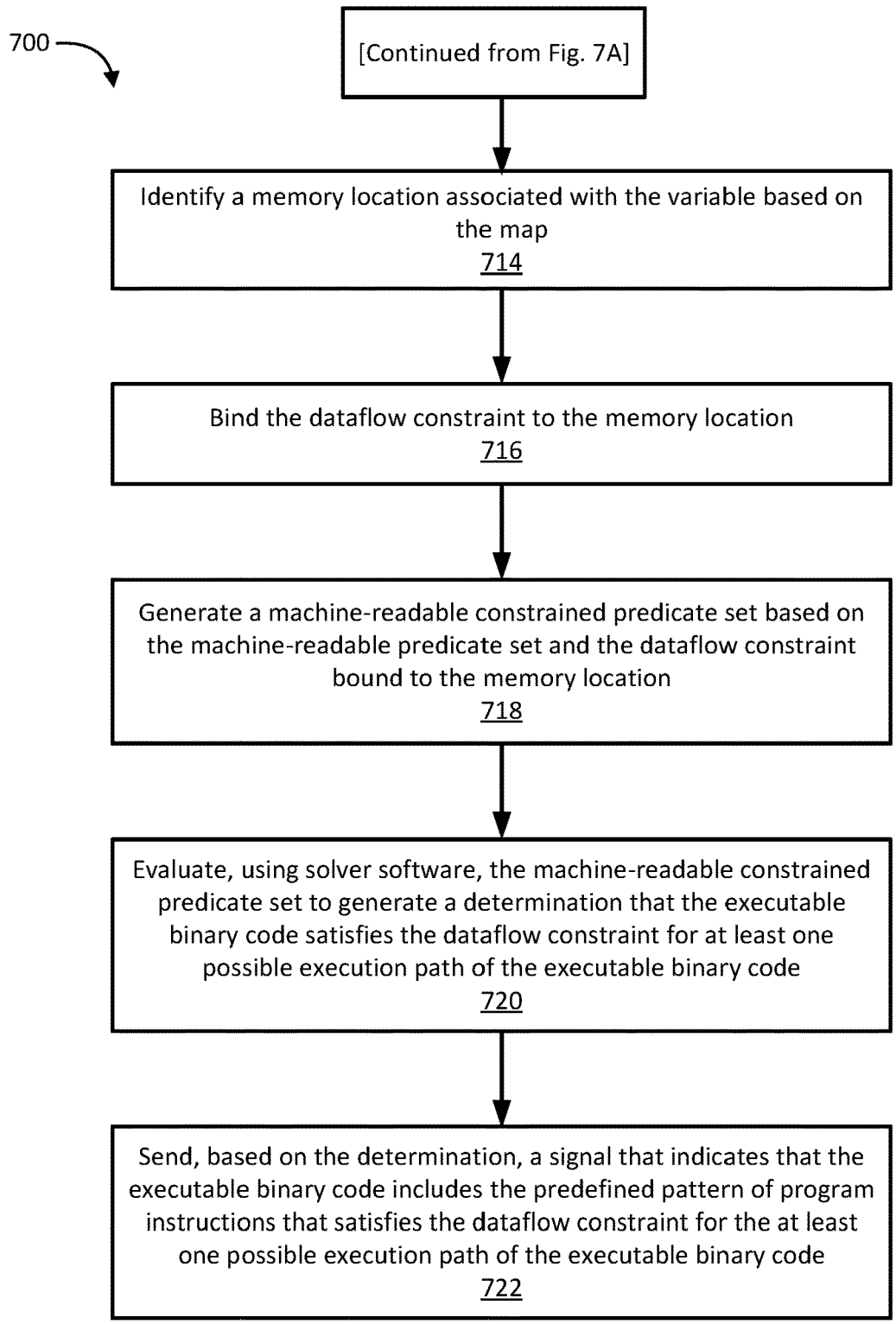

FIGS. 7A-B are flow diagrams collectively showing a method 700 for generating a determination that executable binary code includes a predefined pattern of program instructions that satisfies a dataflow constraint, according to an embodiment. The method 700 can be implemented by a binary code analysis system described herein (e.g., the binary code analysis system 100 of FIG. 1). Portions of the method 700 can be implemented using a processor (e.g., the processor 220 of FIG. 2) of any suitable compute device (e.g., the compute device 110 of FIG. 1 and/or the compute device 201 of FIG. 2).

At 702, the method 700 includes receiving a file that includes executable binary code. At 704, the method 700 includes receiving a machine-readable specification that defines (a) a predefined pattern of program instructions and (b) a dataflow constraint associated with a variable. At 706, a control flow graph is generated based on (1) the executable binary code and (2) a map associated with at least one instruction to be called by the executable binary code. The method 700 at 708 includes identifying, based on the machine-readable specification and the control flow graph, the predefined pattern of program instructions as being included in the executable binary code. In response to the predefined pattern of program instructions being included in a path of the executable binary code, at 710, the method 700 includes generating the path of the executable binary code that includes the predefined pattern of program instructions, and at 712, a machine-readable predicate set is generated based on the path of the executable binary code. A memory location associated with the variable is identified at 714 based on the map. At 716, the method 700 includes binding the dataflow constraint to the memory location. A machine-readable constrained predicate set is generated at 718 based on the machine-readable predicate set and the dataflow constraint that binds the dataflow constraint to the appropriate memory location at the appropriate location in the program. The method 700 at 720 includes evaluating, using solver software, the machine-readable constrained predicate set to generate a determination that the executable binary code satisfies the dataflow constraint for at least one possible execution path of the executable binary code. Based on the determination, at 722, a signal is sent that indicates that the executable binary code includes the predefined pattern of program instructions that satisfies the dataflow constraint for the at least one possible execution path of the executable binary code.

In an embodiment, a method includes receiving executable binary code and a machine-readable specification that (1) defines a control flow pattern and a dataflow constraint and (2) is associated with a library function call. Machine-readable code is executed to retrieve a target of a library function call site, the target being reachable by one or more indirect jumps, and the library function call site being associated with the library function call and included in the executable binary code. An indication of an execution path in the executable binary code is identified based on (1) the control flow pattern defined by the machine-readable specification and (2) the target. An argument of the library function call is identified based on (1) the dataflow constraint defined by the machine-readable specification, (2) the target, and (3) the indication of the execution path. The method also includes determining, using solver software, that the argument satisfies the dataflow constraint defined by machine-readable specification. A signal that indicates that the executable binary code is associated with a predetermined software action is transmitted in response to at least one of (1) the identifying the indication of the execution path or (2) the determining that the argument satisfies the dataflow constraint.

In some implementations, the library function call can include at least one of a system call or a privileged instruction. In some implementations, the machine-readable specification can be associated with (1) a domain-specific language, (2) at least one first syntactic element for specifying a control flow pattern, and (3) at least one second syntactic element for specifying a dataflow constraint. Additionally, the at least one first syntactic element and the at least one second syntactic element can be associated with a Backus-Naur form notation. In some implementations, the machine-readable specification can include at least one of (1) the at least one first syntactic element or (2) the at least one second syntactic element in a definition block of a behavior library. In some implementations, the dataflow constraint can be represented by at least one of an arithmetic operation, a logical operation, a bitwise operation, or a metafunction.

In some implementations, the identifying the indication of the execution path can include (1) generating a control flow graph based on the executable binary code and (2) searching the control flow graph for the library function call based on the control flow pattern defined by the machine-readable specification. In some implementations, the identifying the indication of the execution path can include generating, via the processor, a plurality of segments of the executable binary code, each segment from the plurality of segments being smaller than the executable binary code. Additionally, the identifying the indication of the execution path can include, for each segment from the plurality of segments, searching the segment for the library function call, via the processor and based on the control flow pattern defined by the machine-readable specification, to produce the indication of the execution path.

In some implementations, the identifying the indication of the execution path can include generating, via the processor, a plurality of segments of the executable binary code, each segment from the plurality of segments being associated with a different set of one or more library function calls from a plurality of library function calls. Additionally, the identifying the indication of the execution path can include identifying, via the processor, a segment from the plurality of segments based on a first portion of the control flow pattern defined by the machine-readable specification, the first portion being associated with the library function call, and the control flow pattern spanning a function boundary associated with the library function call. Additionally, the identifying the indication of the execution path can include searching, via the processor and to produce the indication of the execution path, the executable binary code based on the segment and a second portion of the control flow pattern defined by the machine-readable specification, the second portion of the control flow pattern being (1) different from the first portion and (2) associated with a portion of the executable binary code that does not include the library function call site.

In some implementations, the control flow pattern defined by the machine-readable specification can include at least one of (1) a sequence pattern, (2) an if-then pattern, (3) an if-then-else pattern, (4) a while pattern, or (5) a predefined code segment. In some implementations, the signal can include an indication of one or more slices of the executable binary code. In some implementations, the solver software can be associated with a satisfiability modulo theory (SMT) solver. In some implementations, the method can further include not executing the executable binary code. In some implementations, the method can further include not referencing a source code associated with the executable binary code.

In an embodiment, a non-transitory processor-readable medium stores code representing instructions to be executed by one or more processors, and the instructions include code to cause the one or more processors to receive (1) a file that includes executable binary code and (2) a machine-readable specification that defines (a) a predefined pattern of program instructions and (b) a dataflow constraint associated with a variable. Additionally, the one or more processors generate a control flow graph based on (1) the executable binary code and (2) a map associated with at least one instruction to be called by the executable binary code. The instructions further include instructions to identify, based on the machine-readable specification and the control flow graph, the predefined pattern of program instructions as being included in the executable binary code. In response to the predefined pattern of program instructions being included in a path of the executable binary code, the one or more processors return the path of the executable binary code that includes the predefined pattern of program instructions, and further generate a machine-readable predicate set based on the path of the executable binary code. The instructions further include instructions to (1) identify a memory location associated with the variable based on the map, (2) bind the dataflow constraint to the memory location, and (3) generate a machine-readable constrained predicate set based on the machine-readable predicate set and the dataflow constraint bound to the memory location. Additionally, the one or more processors evaluate, using solver software, the machine-readable constrained predicate set to generate a determination that the executable binary code satisfies the dataflow constraint for at least one possible execution path of the executable binary code. Based on the determination, a signal is sent that indicates that the executable binary code includes the predefined pattern of program instructions that satisfies the dataflow constraint for the at least one possible execution path of the executable binary code.

In some implementations, the at least one instruction can include at least one of a system call or a library call. In some implementations, the map can be a data structure that can associate the at least one instruction with a tag, and the instructions to generate the control flow graph can include instructions to identify at least one function based on the tag, and generate the control flow graph based on the at least one function. In some implementations, the instructions can cause the one or more processors to parse the executable binary code without executing the executable binary code. In some implementations, the predefined pattern can include at least one of (1) a contiguous sequence that includes the at least one instruction, (2) a non-contiguous sequence that includes the at least one instruction, (3) an ordered sequence that includes the at least one instruction, (4) an unordered sequence that includes the at least one instruction, (5) the at least one instruction executed conditionally, (6) the at least one instruction executed as part of a loop, or (7) a predefined instruction.

In some implementations, the instructions can cause the one or more processors to identify the predefined pattern without referencing a source code associated with the executable binary code. In some implementations, the machine-readable predicate set can have a single static assignment (SSA) form. In some implementations, the code can further include code to cause the one or more processors to modify, based on the signal, a program instruction included in the executable binary code and associated with the dataflow constraint. In some implementations, the machine-readable specification can be associated with (1) a first domain-specific language for specifying at least one control flow pattern and (2) a second domain-specific language for specifying at least one dataflow constraint. Additionally, the first domain-specific language and the second domain-specific language can be associated with a Backus-Naur form notation. In some implementations, the variable can be one of a local variable, a global variable, or a function call parameter.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EE- PROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method comprising:
   receiving, at a processor, executable binary code;
   receiving, at the processor, a machine-readable specification that (1) defines a control flow pattern and a dataflow constraint and (2) is associated with a library function call;
   executing, via the processor, machine-readable code to retrieve a target of a library function call site, the target being reachable by one or more indirect jumps, and the library function call site being associated with the library function call and included in the executable binary code;
   identifying, via the processor, an indication of an execution path in the executable binary code based on (1) the control flow pattern defined by the machine-readable specification and (2) the target;
   binding the dataflow constraint to a memory location;
   identifying, via the processor, an argument of the library function call based on (1) the dataflow constraint bound to the memory location, (2) the target, and (3) the indication of the execution path;
   determining, via the processor and using solver software, that the argument satisfies the dataflow constraint defined by machine-readable specification; and
   transmitting, via the processor, a signal that indicates that the executable binary code is associated with a predetermined software action in response to at least one of (1) the identifying the indication of the execution path or (2) the determining that the argument satisfies the dataflow constraint.

2. The method of claim 1, wherein the library function call includes at least one of a system call or a privileged instruction.

3. The method of claim 1, wherein:
   the machine-readable specification is associated with (1) a domain-specific language, (2) at least one first syntactic element for specifying the control flow pattern, and (3) at least one second syntactic element for specifying the dataflow constraint; and
   the at least one first syntactic element and the at least one second syntactic element are associated with a Backus-Naur form notation.

4. The method of claim 3, wherein the machine-readable specification includes at least one of (1) the at least one first syntactic element or (2) the at least one second syntactic element in a definition block of a behavior library.

5. The method of claim 1, wherein the dataflow constraint is represented by at least one of an arithmetic operation, a logical operation, a bitwise operation, or a metafunction.

6. The method of claim 1, wherein the identifying the indication of the execution path includes:
   generating a control flow graph based on the executable binary code; and
   searching the control flow graph for the library function call based on the control flow pattern defined by the machine-readable specification.

7. The method of claim 1, wherein the identifying the indication of the execution path includes:
   generating, via the processor, a plurality of segments of the executable binary code, each segment from the plurality of segments being smaller than the executable binary code; and
   for each segment from the plurality of segments, searching the segment for the library function call, via the processor and based on the control flow pattern defined by the machine-readable specification, to produce the indication of the execution path.

8. The method of claim 1, wherein the identifying the indication of the execution path includes:
   generating, via the processor, a plurality of segments of the executable binary code, each segment from the plurality of segments being associated with a different library function call from a plurality of library function calls;
   identifying, via the processor, a segment from the plurality of segments based on a first portion of the control flow pattern defined by the machine-readable specification, the first portion being associated with the library function call, and the control flow pattern spanning a function boundary associated with the library function call; and searching, via the processor and to produce the indication of the execution path, the executable binary code based on the segment and a second portion of the control flow pattern defined by the machine-readable specification, the second portion of the control flow pattern being (1) different from the first portion and (2) associated with a portion of the executable binary code that does not include the library function call site.

9. The method of claim 1, wherein the control flow pattern defined by the machine-readable specification includes at least one of (1) a sequence pattern, (2) an if-then pattern, (3) an if-then-else pattern, (4) a while pattern, or (5) a predefined code segment.

10. The method of claim 1, wherein the signal includes an indication of one or more slices of the executable binary code.

11. The method of claim 1, wherein the solver software is associated with a satisfiability modulo theory (SMT) solver.

12. The method of claim 1, further comprising:
not executing the executable binary code.

13. The method of claim 1, further comprising:
not referencing a source code associated with the executable binary code.

14. A non-transitory processor-readable medium storing code representing instructions to be executed by one or more processors, the instructions comprising code to cause the one or more processors to:

receive a file that includes executable binary code;

receive a machine-readable specification that defines (1) a predefined pattern of program instructions and (2) a dataflow constraint associated with a variable;

generate a control flow graph based on the executable binary code and a map associated with at least one instruction to be called by the executable binary code;

identify, based on the machine-readable specification and the control flow graph, the predefined pattern of program instructions as being included in the executable binary code;

in response to the predefined pattern of program instructions being included in a path of the executable binary code, return the path of the executable binary code that includes the predefined pattern of program instructions;

generate a machine-readable predicate set based on the path of the executable binary code;

identify a memory location associated with the variable based on the map;

bind the dataflow constraint to the memory location;

generate a machine-readable constrained predicate set based on the machine-readable predicate set and the dataflow constraint bound to the memory location;

evaluate, using solver software, the machine-readable constrained predicate set to generate a determination that the executable binary code satisfies the dataflow constraint for at least one possible execution path of the executable binary code; and send, based on the determination, a signal that indicates that the executable binary code includes the predefined pattern of program instructions that satisfies the dataflow constraint for the at least one possible execution path of the executable binary code.

15. The non-transitory processor-readable medium of claim 14, wherein the at least one instruction includes at least one of a system call or a library call.

16. The non-transitory processor-readable medium of claim 14, wherein:
the map is a data structure that associates the at least one instruction with a tag; and
the instructions to generate the control flow graph include instructions to:
identify at least one function based on the tag, and
generate the control flow graph based on the at least one function.

17. The non-transitory processor-readable medium of claim 14, wherein the instructions cause the one or more processors to parse the executable binary code without executing the executable binary code.

18. The non-transitory processor-readable medium of claim 14, wherein the predefined pattern includes at least one of (1) a contiguous sequence that includes the at least one instruction, (2) a non-contiguous sequence that includes the at least one instruction, (3) an ordered sequence that includes the at least one instruction, (4) an unordered sequence that includes the at least one instruction, (5) the at least one instruction executed conditionally, (6) the at least one instruction executed as part of a loop, or (7) a predefined instruction.

19. The non-transitory processor-readable medium of claim 14, wherein the instructions cause the one or more processors to identify the predefined pattern without referencing a source code associated with the executable binary code.

20. The non-transitory processor-readable medium of claim 14, wherein the machine-readable predicate set has a single static assignment (SSA) form.

21. The non-transitory processor-readable medium of claim 14, wherein the code further comprises code to cause the one or more processors to:
modify, based on the signal, a program instruction included in the executable binary code and associated with the dataflow constraint.

22. The non-transitory processor-readable medium of claim 14, wherein:
the machine-readable specification is associated with (1) a first domain-specific language for specifying at least one control flow pattern and (2) a second domain-specific language for specifying at least one dataflow constraint; and
the first domain-specific language and the second domain-specific language are associated with a Backus-Naur form notation.

23. The non-transitory processor-readable medium of claim 14, wherein the variable is at least one of a local variable, a global variable, or a function call parameter.

* * * * *